United States Patent
Lee et al.

(10) Patent No.: US 11,860,687 B2
(45) Date of Patent: Jan. 2, 2024

(54) SEMICONDUCTOR DEVICE

(71) Applicant: SAMSUNG ELECTRONICS CO., LTD., Suwon-si (KR)

(72) Inventors: Jae Gon Lee, Seongnam-si (KR); Jae Young Lee, Hwaseong-si (KR); Se Hun Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/099,077

(22) Filed: Jan. 19, 2023

(65) Prior Publication Data

US 2023/0152841 A1    May 18, 2023

Related U.S. Application Data

(63) Continuation of application No. 17/372,122, filed on Jul. 9, 2021, now Pat. No. 11,592,861.

(30) Foreign Application Priority Data

Aug. 12, 2020  (KR) .......... 10-2020-0100969
Jun. 3, 2021   (KR) .......... 10-2021-0072230

(51) Int. Cl.
*G06F 1/10* (2006.01)
(52) U.S. Cl.
CPC .................... *G06F 1/10* (2013.01)
(58) Field of Classification Search
CPC ........................................ G06F 1/10
See application file for complete search history.

(56) References Cited

U.S. PATENT DOCUMENTS

| | | |
|---|---|---|
| 8,860,502 B2 | 10/2014 | Gemmeke et al. |
| 9,698,796 B2 | 7/2017 | Sekiguchi |
| 9,766,649 B2 | 9/2017 | Felix et al. |
| 10,209,734 B2 | 2/2019 | Lee et al. |
| 10,248,155 B2 | 4/2019 | Kim et al. |
| 10,296,065 B2 | 5/2019 | Lee et al. |
| 2011/0119672 A1 | 5/2011 | Ramaraju |
| 2012/0005513 A1 | 1/2012 | Brock |
| 2014/0028364 A1 | 1/2014 | Venkatraman |
| 2015/0022272 A1 | 1/2015 | Felix |

FOREIGN PATENT DOCUMENTS

| | | |
|---|---|---|
| JP | 5384910 B2 | 1/2014 |
| JP | 2016143206 A | 8/2016 |

*Primary Examiner* — Stefan Stoynov
(74) *Attorney, Agent, or Firm* — Fish & Richardson P.C.

(57) ABSTRACT

A semiconductor device includes an intellectual property (IP) block, a clock management unit, a critical path monitor (CPM), and a CPM clock manager included in the clock management unit. The clock management unit is configured to receive a clock request signal, indicating whether the IP block requires a clock signal, from the IP block and perform clock gating for the IP block based on the received clock request signal. The CPM is configured to monitor the clock signal provided to the IP block to adjust at least one of a frequency of the clock signal provided to the IP block and a voltage supplied to the IP block. The CPM clock manager is configured to perform the clock gating for the CPM.

19 Claims, 22 Drawing Sheets

NAND2

Wire

SEMICONDUCTOR DEVICE

This is a Continuation of U.S. application Ser. No. 17/372,122, filed Jul. 9, 2021, and a claim priority under 35 U.S.C. § 119 is made to Korean Patent Application No. 10-2020-0100969 filed on Aug. 12, 2020, in the Korean Intellectual Property Office and from Korean Patent Application No. 10-2021-0072230 filed on Jun. 3, 2021, in the Korean Intellectual Property Office, the disclosures of which are incorporated herein by reference in their entireties.

BACKGROUND

1. Field of the Disclosure

The present disclosure relates to a semiconductor device.

2. Description of the Related Art

With the increases in integration degree, size, and operating speed of semiconductor devices, a low power consumption issue has become a very important factor. This is because high power consumption may cause a temperature rise of a chip to cause not only malfunction of the chip but also the breakage of a package.

In semiconductor circuits of semiconductor devices, sometimes, there is a need for a circuit for providing or blocking a clock for the purpose of reducing power. A clock gating circuit is used so that a clock is not provided to a specific circuit when the circuit does not need to operate.

In addition, in order to reduce power consumption of semiconductor devices, a dynamic voltage frequency scaling (DVFS) technique for changing an operation clock frequency in a chip or changing a magnitude of a supplied driving voltage is also used.

In a clock gating technique, a clock is cut off to reduce power consumption, but in a DVFS technique, a clock, which is to be monitored and of which a frequency is to be changed, is always required. Therefore, research is being conducted to effectively use both techniques.

SUMMARY

Aspects of the present disclosure provide a semiconductor device having reduced power consumption.

It should be noted that objects of the present disclosure are not limited to the above-described objects, and other objects of the present disclosure will be apparent to those skilled in the art from the following descriptions.

According to some embodiments, a semiconductor device includes an intellectual property (IP) block; a clock management unit configured to receive a clock request signal, indicating whether the IP block requires a clock signal, from the IP block and configured to perform clock gating for the IP block based on the received clock request signal; a critical path monitor (CPM) configured to monitor the clock signal provided to the IP block to adjust at least one of a frequency of the clock signal provided to the IP block and a voltage supplied to the IP block; and a CPM clock manager included in the clock management unit and configured to perform the clock gating for the CPM.

According to some embodiments, a semiconductor device includes a processor; a clock generator configured to output a clock signal provided to the processor; a CPM configured to monitor the clock signal provided to the processor to adjust at least one of a frequency of the clock signal provided to the processor and a voltage supplied to the processor; and a CPM clock manager configured to receive a signal for requesting to stop provision of the clock signal from the processor and then perform clock gating for the CPM in response to the received signal.

According to some embodiments, a semiconductor device includes an IP block; a first clock component configured to receive a first request signal, indicating whether the IP block requires a clock signal, from the IP block and configured to provide a first clock signal to the IP block based on the received request signal; a second clock component configured to receive a second request signal, indicating whether the IP block requires the clock signal, from the first clock component and configured to provide a second clock signal to the first clock component based on the received second request signal, and a CPM configured to monitor the clock signal provided to the IP block to adjust at least one of a frequency of the clock signal provided to the IP block and a voltage supplied to the IP block. After a signal is received from the IP block requesting a discontinuation of the first clock signal, the first clock component transmits a third request signal, which indicates a stop request for the second clock signal, to the CPM in response to the received signal.

Specific details of other exemplary embodiments are contained in the following detailed description and accompanying drawings.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Hereinafter, exemplary embodiments according to the technical spirit of the present disclosure will be described with reference to the accompanying drawings.

Figure 1:
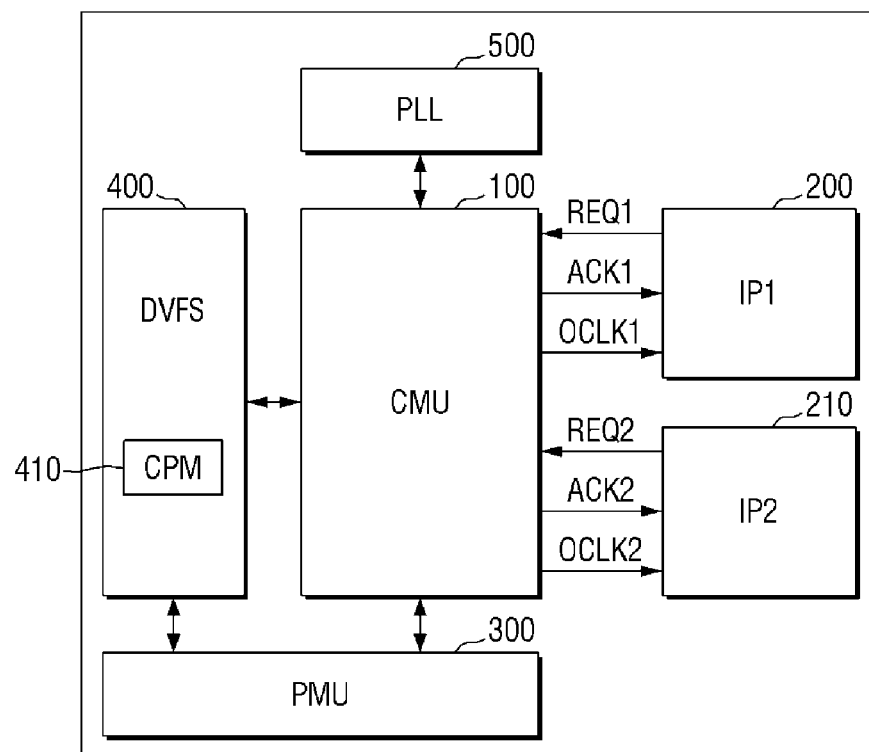
FIG. 1 is a block diagram illustrating a semiconductor device (system-on-chip) according to some embodiments.

FIG. 1 is a block diagram illustrating a semiconductor device (system-on-chip) according to some embodiments.

Referring to FIG. 1, a semiconductor device 1 according to some embodiments may include a clock management unit (CMU) 100, first and second intellectual property (IP) blocks 200 and 210, a power management unit (PMU) 300, a dynamic voltage frequency scaling (DVFS) block 400, and a clock generator 500.

The CMU 100 may generate operation clock signals to be provided to the first and second IP blocks 200 and 210. For example, the CMU 100 may generate a first operation clock signal OCLK1 necessary for the operation of the first IP block 200 and a second operation clock signal OCLK2 necessary for the operation of the second IP block 210.

The first and second IP blocks 200 and 210 may be connected to a system bus and may communicate with each other through the system bus. In some embodiments, the first and second IP blocks 200 and 210 may each include, for example, a processor, a graphic processor, a memory controller, an input and output interface block, and the like, but exemplary embodiments are not limited thereto. In addition, in some embodiments, the first and second IP blocks 200 and 210 may include processors having different computational throughputs, such as a big core and a little core.

Although only an example of the two IP blocks 200 and 210 are illustrated in the drawing, exemplary embodiments are not limited thereto, and the number of the IP blocks included in the semiconductor device 1 may be implemented differently as needed.

At least one of the first and second IP blocks 200 and 210 may transmit a clock request signal to the CMU 100 according to a full handshake method.

For example, the first IP block 200 may transmit a first clock request signal REQ1 to the CMU 100 according to the full handshake method. The CMU 100 may receive the first clock request signal REQ1 and may transmit a first clock response signal ACK1 to the first IP block 200. In addition, at the same time, the CMU 100 may transmit the first operation clock signal OCLK1 to the first IP block 200.

For example, the second IP block 210 may transmit a second clock request signal REQ2 to the CMU 100 according to the full handshake method. The CMU 100 may receive the second clock request signal REQ2 and may transmit a second clock response signal ACK2 to the second IP block 210. In addition, at the same time, the CMU 100 may transmit the second operation clock signal OCLK2 to the second IP block 210.

In some embodiments, an interface between the CMU 100 and the first and second IP blocks 200 and 210 may have a type of full handshake method. In some embodiments, such an interface may be implemented to follow a Q-channel interface or P-channel interface of the ARM Company, but the exemplary embodiments are not limited thereto.

Clock gating is a function of dividing the inside of a computer system into small functional blocks and cutting off power to unused parts. Since all parts of a computer system do not always operate when a computer is actually used, blocks in unused parts may be stopped to reduce power consumption and also to reduce heat generated in blocks whose functions are stopped.

When there is an IP block that does not require an operation clock among the first IP block 200 and the second IP block 210, the CMU 100 may perform sequential clock gating to automatically perform clock gating without generating an error in the operation of the IP block that does not require an operation clock, thereby reducing power consumption.

The PMU 300 controls a voltage supplied to the semiconductor device 1. For example, when the semiconductor device 1 enters a standby mode, the PMU 300 may turn a power adjustment circuit off to cut off a supply voltage supplied to the semiconductor device 1. In this case, the PMU 300 may continuously consume power, but since the power consumed by the PMU 300 corresponds to a very small portion of power consumed by the entire semiconductor device 1, in the standby mode, power consumption of the semiconductor device 1 can be greatly reduced.

Specifically, when the semiconductor device 1 is in a standby mode, the PMU 300 may cut off power supplied to the CMU 100. However, this may correspond to a case in which there is no clock request from the first and second IP blocks 200 and 210.

The DVFS block 400 may perform a DVFS operation on the first IP block 200 and the second IP block 210. In some embodiments, the DVFS block 400 may perform a closed loop DVFS operation on the first IP block 200 and the second IP block 210.

Specifically, the DVFS block 400 may monitor clock signals provided to the first IP block 200 and the second IP block 210 through an inner loop, and if necessary, the DVFS block 400 may adjust frequencies of the clock signals provided to the first IP block 200 and the second IP block 210.

In addition, the DVFS block 400 may monitor voltages supplied to the first IP block 200 and the second IP block 210 through an outer loop, and if necessary, the DVFS block 400 may adjust the voltages supplied to the first IP block 200 and the second IP block 210.

Herein, although the DVFS block 400 for performing the DVFS operation on the first IP block 200 and the second IP block 210 is separately illustrated for convenience of description, unlike what is illustrated, the DVFS block 400 may not be implemented separately from CMU 100, the PMU 300, the clock generator 500, and like. In some embodiments, at least some or all components of the CMU 100, the PMU 300, and the clock generator 500 may be included in the DVFS block 400.

For such an operation, the DVFS block 400 may include a critical path monitor (CPM) 410. For example, in order to perform a DVFS operation on the first IP block 200, the CPM 410 may monitor a clock signal provided to the first IP block 200. That is, the CPM 410 may monitor a clock provided to the first IP block 200 to adjust a frequency of the first operation clock signal OCLK1 provided to the first IP block 200.

In some embodiments, in order to perform a DVFS operation on the second IP block 210, the CPM 410 may monitor a clock signal provided to the second IP block 210. That is, the CPM 410 may monitor a clock provided to the second IP block 210 to adjust a frequency of the second operation clock signal OCLK2 provided to the second IP block 210.

Although only one CPM 410 is illustrated in the drawing, exemplary embodiments are not limited thereto. In some embodiments, the DVFS block 400 may include a first CPM for monitoring a clock provided to the first IP block 200 to adjust a frequency of the first operation clock signal OCLK1 provided to the first IP block 200 and a second CPM for monitoring a clock provided to the second IP block 210 to adjust a frequency of the second operation clock signal OCLK2 provided to the second IP block 210. That is, an independent CPM may also be disposed for each IP block.

In some embodiments, the DVFS block 400 may include as many CPMs as the number of the IP blocks included in the semiconductor device 1. That is, when n IP blocks are disposed in the semiconductor device 1, the DVFS block 400 may also include n CPMs (wherein n is a natural number).

The clock generator 500 may generate a clock signal necessary for the operation of the semiconductor device 1. Hereinafter, an example in which the clock generator 500 is a phase lock loop (PLL) will be described, but the exemplary embodiments are not limited thereto. Clock signals generated by the PLL 500 may be provided to the CMU 100 and provided to the first and first IP blocks 200 and 210.

Figure 2:
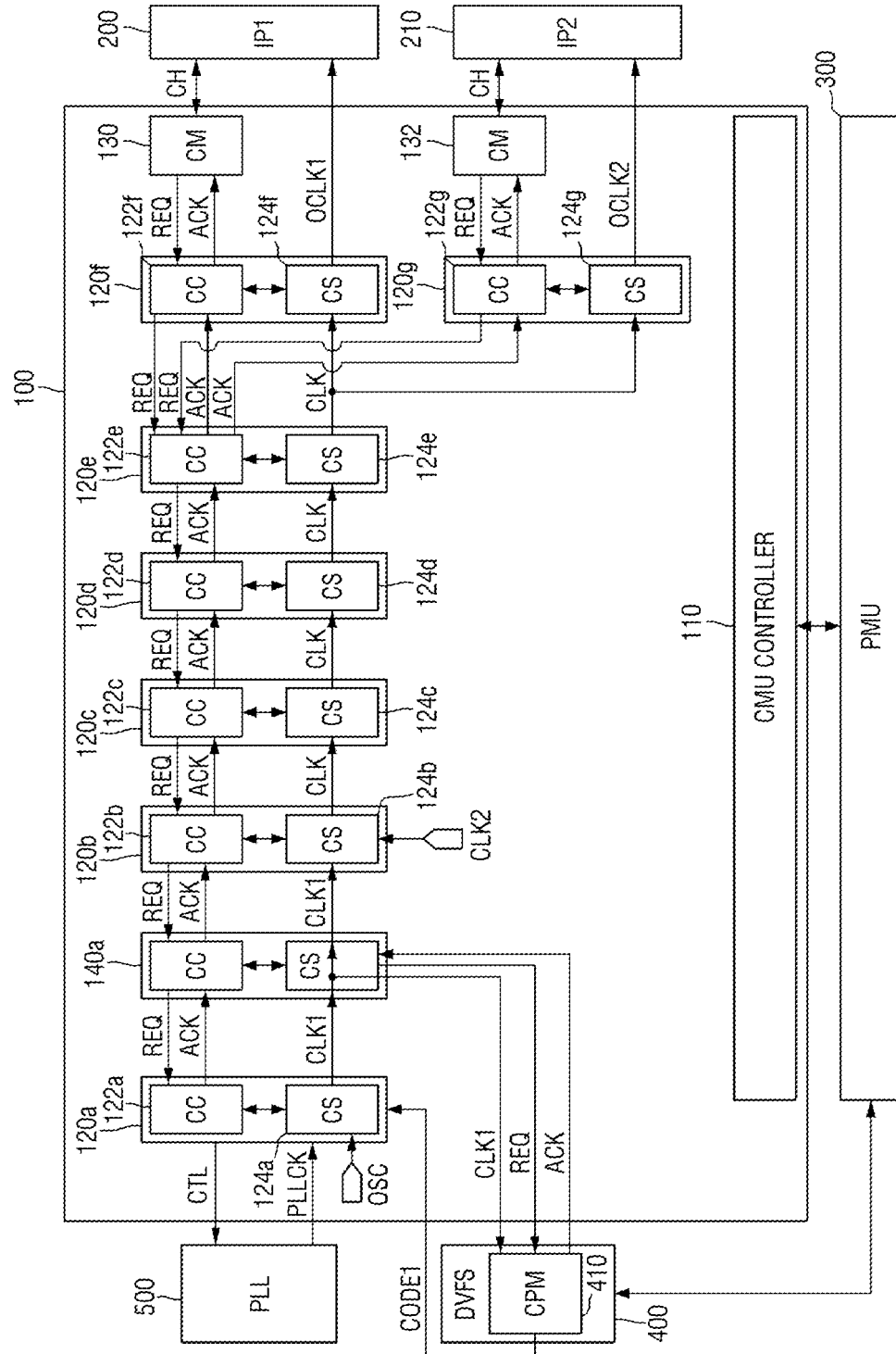
FIG. 2 is a block diagram illustrating a clock management unit included in a semiconductor device according to some embodiments.

FIG. 2 is a block diagram illustrating a CMU included in a semiconductor device (system-on-chip) according to some embodiments.

Referring to FIG. 2, a CMU 100 includes clock components 120a, 120b, 120c, 120d, 120e, 120f, and 120g, channel management circuits (CMs) 130 and 132, a CMU controller 110, and CPM clock manager 140a.

The clock components 120a, 120b, 120c, 120d, 120e, 120f, and 120g generate clock signals to be provided to IP blocks 200 and 210, and the CMs 130 and 132 are disposed between the clock components 120f and 120g and the IP blocks 200 and 210 to provide communication channels CH between the CMU 100 and the IP blocks 200 and 210. The CMU controller 110 provides clock signals to the IP blocks 200 and 210 using the clock components 120a, 120b, 120c, 120d, 120e, 120f, and 120g.

In some embodiments, the communication channels CH provided by the CMs 130 and 132 may be implemented to follow a low power interface (LPI), a Q-channel interface, or a P-channel interface of the ARM Company, but the exemplary embodiments are not limited thereto.

The clock components 120a, 120b, 120c, 120d, 120e, 120f, and 120g respectively include clock sources (CSs) 124a, 124b, 124c, 124d, 124e, 124f, and 124g and clock control circuits (CCs) 122a, 122b, 122c, 122d, 122e, 122f, and 122g for respectively controlling the CSs 124a, 124b, 124c, 124d, 124e, 124f, and 124g.

Here, the CSs 124a, 124b, 124c, 124d, 124e, 124f, and 124g may include, for example, a multiplexer circuit (MUX circuit), a clock dividing circuit, a short stop circuit, a clock gating circuit, and the like.

The clock components 120a, 120b, 120c, 120d, 120e, 120f, and 120g form a parent-child relationship with each other. In the illustrated example, the clock component 120a is a parent of the clock component 120b, and the clock component 120b is a child of the clock component 120a and a parent of the clock component 120c. In addition, the clock component 120e is a parent of two clock components 120f and 120g, and the clock components 120f and 120g are children of the clock component 120e.

Meanwhile, in the present exemplary embodiment, the clock component 120a disposed closest to a PLL 500 is a root clock component, and the clock components 120f and 120g disposed closest to the IP blocks 200 and 210 are leaf clock components.

Such a parent-child relationship is also inevitably formed between the CCs 122a, 122b, 122c, 122d, 122e, 122f, and 122g and between the CSs 124a, 124b, 124c, 124d, 124e, 124f, and 124g according to the parent-child relationship between the clock components 120a, 120b, 120c, 120d, 120e, 120f, and 120g.

The CCs 122a, 122b, 122c, 122d, 122e, 122f, and 122g transmit and receive a clock request signal REQ and an acknowledgment signal ACK for the clock request signal REQ between the parent and the child and provide operation clock signals OCLK1 and OCLK2 to the IP blocks 200 and 210.

For example, when the IP block 200 does not require a first operation clock signal OCLK1, for example when the IP block 200 needs to enter a sleep state, the CMU 100 stops providing the first operation clock signal OCLK1 to the IP block 200.

Specifically, under control of the CMU 100 or the CMU controller 110, the CM 130 transmits a first signal, which indicates a stop request for provision of the first operation clock signal OCLK1, to the IP block 200.

The IP block 200 receiving the first signal transmits, after a task that is being processed is completed, a second signal, which indicates that the clock signal may be stopped, to the CM 130. After receiving the second signal from the IP block 200, the CM 130 requests the clock component 120f corresponding to a parent thereof to stop providing the clock signal.

For example, when the communication channel CH provided by the CM 130 follows a Q-channel interface, the CM 130 transmits a QREQn signal having a first logical value (for example, a logic low, hereinafter denoted by L) to the IP block 200 as the first signal. Then, after receiving a QACCEPTn signal having, for example, the first logical value L, from the IP block 200 as the second signal, the CM 130 transmits the clock request signal REQ having, for example, the first logical value L, to the clock component 120f. In this case, the clock request signal REQ having the first logical value L means a "clock provision stop request."

The CC 122f, which receives the clock request signal REQ having the first logical value L, that is, a clock provision stop request from the CM 130, disables the CS 124f (for example, a clock gating circuit) to stop providing the first operation clock signal OCLK1. Accordingly, the first IP block 200 may enter a sleep mode.

In such a process, the CC 122f may provide the acknowledgement signal ACK having the first logical value L to the CM 130. Here, even when the CM 130 transmits the clock provision stop request REQ having the first logical value L and then receives the acknowledgement signal ACK having the first logical value L, it is not ensured that provision of a clock from the CS 124f is stopped.

The acknowledgment signal ACK only means that the CC 122f recognizes that the clock component 120f, which is a parent of the CM 130, no longer needs to provide the first operation clock signal OCLK1 to the IP block 200.

Meanwhile, the CC 122f of the clock component 120f transmits the clock request signal REQ having the first logical value L to the CC 122e of the clock component 120e corresponding to a parent thereof.

When the IP block 210 also does not require a clock signal, for example, when the CC 122e receives a clock provision stop request from the CC 122g, the CC 122e disables the CS 124e (for example, a clock dividing circuit) to stop providing a clock signal.

Such an operation may be similarly performed for other CCs 122a, 122b, 122c, and 122d.

Alternatively, although the CC 122f of the clock component 120f transmits the clock request signal REQ having the first logical value L to the CC 122e of the clock component 120e corresponding to the parent thereof, when the IP block 210 is in a running state or an active state, the CC 122e cannot disable the CS 124e.

Thereafter, only when the IP block 210 no longer requires a clock signal, may the CC 122e disable the CS 124e and transmit the clock request signal REQ having the first logical value L to the CC 120d corresponding to a parent thereof. That is, the CC 122e may disable the CS 124e only when a clock provision stop request is received from both the CCs 122f and 122g corresponding to children thereof.

Meanwhile, when the IP block 200 is in a sleep state, all of the CSs 124a, 124b, 124c, 124d, 124e, and 124f are disabled, and then, when the IP block 200 enters a running state or an active state, the CMU 100 resumes providing a clock signal to the IP block 200.

The CMU 130 transmits the clock request signal REQ having a second logical value (for example, a logic high, hereinafter denoted by H) to the CC 122f of the clock component 120f corresponding to the parent thereof and waits for the acknowledgment signal ACK from the CC 122f. Here, the clock request signal REQ having the second logical value H means a "clock provision request," and the acknowledgment signal ACK for the clock provision request means that provision of a clock from the CS 124f is resumed. The CC 122f does not immediately enable the CS 124f (for example, the clock gating circuit) but waits for a clock signal to be provided from a parent.

Next, the CC 122f transmits the clock request signal REQ having the second logical value H, that is, a clock provision request, to the CC 122e corresponding to the parent thereof and waits for the acknowledgment signal ACK from the CC 122e. Such an operation may be similarly performed for the CCs 122a, 122b, 122c, and 122d.

The CC 122a, which is a root clock component receiving the clock request signal REQ having the second logical value H from the CC 122b, enables the CS 124a (for example, a MUX circuit) and transmits the acknowledgment signal ACK to the CC 122b. When the CSs 124b, 124c, 124d, 124d, and 124e are sequentially enabled in such a manner, the CC 122e finally transmits the acknowledgment signal ACK, which indicates that provision of a clock from the CS 124e is resumed, to the CC 122f. The CC 122f receiving the acknowledgment signal ACK finally enables the CS 124f to provide the operation clock signal OCLK1 to the IP block 200 and transmits the acknowledgment signal ACK to the CM 130.

As described above, the CCs 122a, 122b, 122c, 122d, 122e, 122f, and 122g operate in a full handshake method in which the clock request signal REQ and the acknowledgment signal ACK for the clock request signal REQ are transmitted and received between a parent and a child. Accordingly, the CCs 122a, 122b, 122c, 122d, 122e, 122f, and 122g may control the CSs 124a, 124b, 124c, 124d, 124e, 124f, and 124g in a hardware manner to control the operation clock signal OCLK1 provided to the IP block 200.

The CCs 122a, 122b, 122c, 122d, 122e, 122f, and 122g may self-operate to transmit the clock request signal REQ to the parent or control the CSs 124a, 124b, 124c, 124d, 124e, 124f, and 124g and may also operate under control of the CMU controller 110.

Meanwhile, in some embodiments, the CCs 122a, 122b, 122c, 122d, 122e, 122f, and 122g may include a finite state machine (FSM) which controls each of the CS 124a, 124b, 124c, 124d, 124e, 124f, and 124g according to the clock request signal REQ transmitted and received between a parent and a child.

In some embodiments, the clock component 120a may be, for example, a PLL controller which provides a control signal CTL to the PLL 500 to control an output clock signal PLLCK of the PLL 500.

The PLL controller may receive a constant or variable frequency signal oscillated from an oscillator (OSC) and may operate to automatically turn the PLL 500 off when a component using a PLL output is not present. Alternatively, when the component using the PLL output is not present, the PLL controller may operate to automatically switch the PLL 500 into a bypass mode. Alternatively, when the component using the PLL output is not present, the PLL controller may have no effect on the operation of the PLL 500.

The PLL controller may be implemented as any component that generates a clock. For example, the PLL controller may be implemented using a ring OSC or may be implemented using a crystal OSC.

In some embodiments, the clock component 120b may be, for example, a clock MUX unit.

The clock MUX unit may include the CC 122b and a MUX circuit 124b, and the CC 122b of the clock MUX unit may operate with sequential behavior.

The CC 122b may control turn-on/off of a clock and may autonomously generate a clock request signal for changing a MUX selection of the MUX circuit 124b in a state in which the clock is turned off. The clock request signal autonomously generated by the CC 122b for changing the MUX selection may be supplied only to a previous parent clock component and a subsequent parent clock component or may be supplied to all possible parent clock components. Alternatively, the CC 122b may not generate autonomously the clock request signal for changing the MUX selection.

Figure 3:
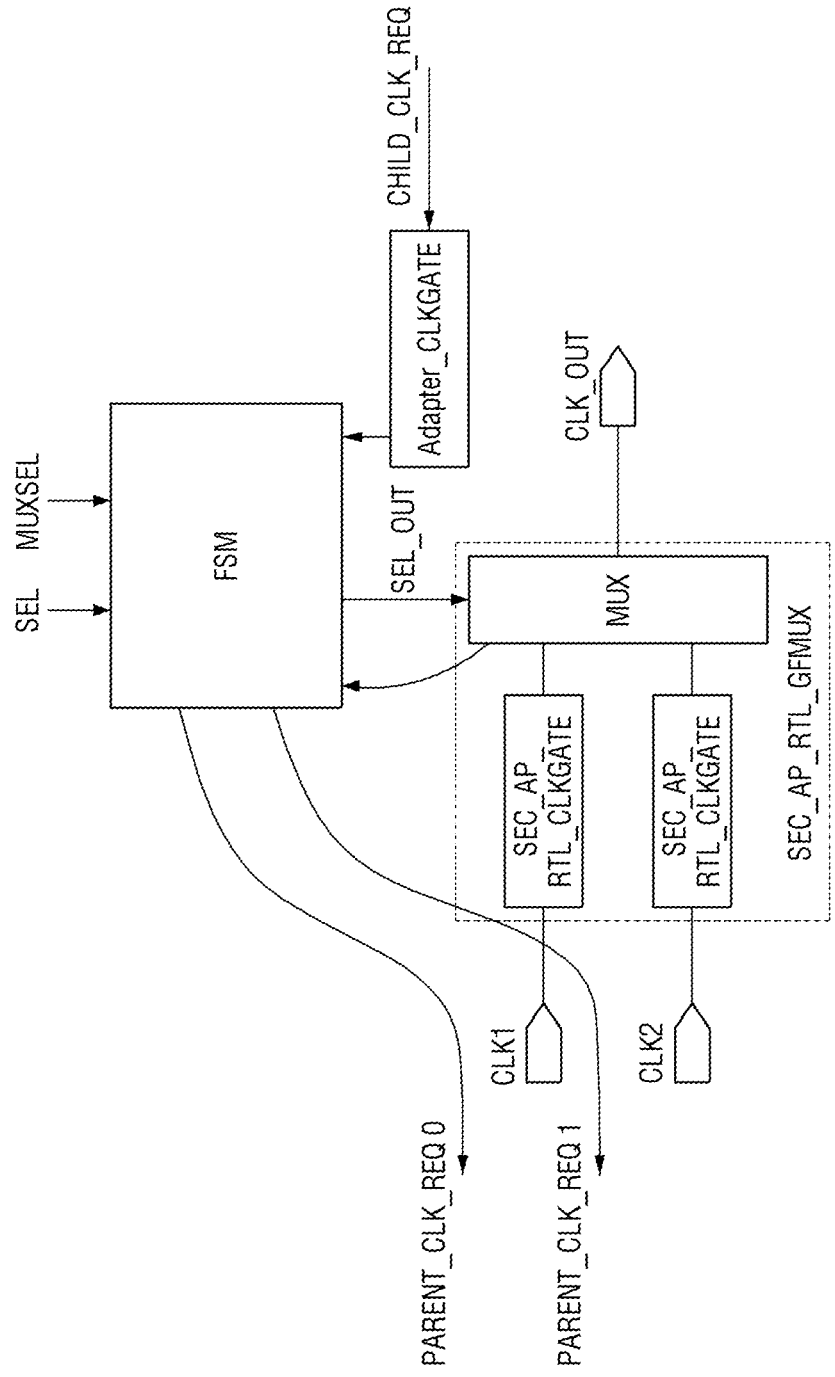
FIG. 3 is a diagram for describing an implementation method of a clock multiplexer (MUX) unit included in a semiconductor device according to some embodiments.
Figure 4:
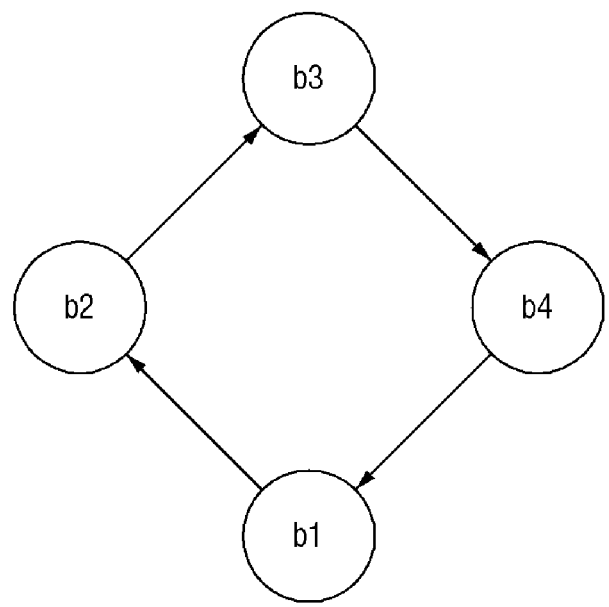
FIG. 4 is a diagram for describing a finite state machine (FSM) of a clock MUX unit included in a semiconductor device according to some embodiments.

FIG. 3 is a diagram for describing an implementation method of a clock MUX unit included in a semiconductor device according to some embodiments, and FIG. 4 is a diagram for describing an FSM of a clock MUX unit included in a semiconductor device according to some embodiments.

Referring to FIG. 3, the clock MUX unit includes an FSM and a MUX circuit SEC_AP_RTL_GFMUX. The FSM receives a clock request signal CHILD_CLK_REQ through an adapter Adapter_CLKGATE from a child clock component and transmits clock request signals PARENT_CLK_REQ 0 and PARENT_CLK_REQ 1 to a parent clock component.

In this case, the clock MUX unit may include a glitch-free MUX. A glitch refers to a temporary malfunction of a computer caused by a noise pulse generated in an unnecessary part.

When the FSM receives a selection signal SEL and confirms that a value of the selection signal SEL is changed, the FSM compares the selection signal SEL with a muxsel signal MUXSEL and then checks whether values of the selection signal and the muxsel signal MUXSEL are the same.

When the values of the selection signal SEL and the muxsel signal MUXSEL are not the same, the FSM generates a detect change signal. Here, a process of generating the detect change signal may be performed by toggling a value of the detect change signal having a low state into a high state or toggling a value of the detect change signal having a high state into a low state.

In response to a selection signal SEL_OUT output from the FSM, the clock MUX unit outputs a first clock signal CLK1 or a second clock signal CLK2 output from a CC (not shown) different from a CC 122a (see FIG. 2) as a clock signal CLK_OUT. In this case, a child clock component 120c (see FIG. 2) receives the clock signal CLK_OUT.

Referring to FIG. 4 together, the FSM included in the clock MUX unit may include the following states.

A first state b1 is a state in which clock gating by hardware operates and is a state in which both of a parent clock component (of the clock MUX unit) stopping the provision of a clock to a child clock component and a parent clock component (of the clock MUX unit) still operating to provide a clock may be present. In this state, it is not ensured that all parent clock components of the clock MUX unit are operating. That is, the state may be a state in which the operation of an unnecessary parent clock component is stopped and power consumption is minimized. Accordingly, the clock MUX unit cannot perform a task of changing a selection according to the selection signal SEL. Unlike a clock gating component, the clock MUX unit may maintain an optimized state even when a clock request signal is received from a child clock component.

A second state b2 is a state in which, since the clock MUX unit needs to change a selection according to the selection signal SEL, all parent clock components of the clock MUX unit are woken up.

A third state b3 is a state in which clock gating by hardware does not operate. That is, the third state b3 is a state in which all parent clock components are woken up and a clock signal is being provided to the clock MUX unit. In such an operation, the clock MUX unit may change a selection according to the selection signal SEL.

A fourth state b4 is a state in which, after the clock MUX unit changes a selection according to the selection signal SEL, clock gating by hardware operates again, and thus, a parent clock component, which does not need to provide a clock, starts to stop the operation thereof. That is, the fourth state b4 is a state in which a clock stop request signal is transmitted to the parent clock component that does not need to provide a clock.

After a clock response signal is received from the parent clock component that does not need to provide a clock, a state may return to the first state b1.

Referring again to FIG. 2, in some embodiments, a clock component 120c and a clock component 120e may be, for example, clock dividing units. Hereinafter, an example of the clock component 120c will be described, and the same may be applied to the clock component 120e.

The clock dividing unit may include a CC 122c and a clock source 124c (i.e. dividing circuit), and the CC 122c of the clock dividing unit may operate with sequential behavior. The CC 122c may control turn-on/off of a clock and may autonomously generate a clock request signal to change a clock dividing ratio of the clock dividing circuit in a state in which the clock is turned off. The CC 122c may not autonomously generate a clock request signal to change a clock dividing ratio of the clock source 124c in a state in which a clock is turned off.

In some embodiments, a clock component 120d may be, for example, a short stop unit.

The short stop unit may include a CC 122d and a clock source 124d (i.e. clock gating circuit), and the CC 122d of the short stop unit may operate with sequential behavior. The CC 122d may control turn-on/off of a clock. When a clock request signal from a child clock component is deactivated, the CC 122d may activate the clock source 124d.

In some embodiments, clock components 120f and 120g may be, for example, clock gating units.

The clock gating unit may communicate with at least one of CMs 130 and 132 according to a full handshake method.

Figure 5:
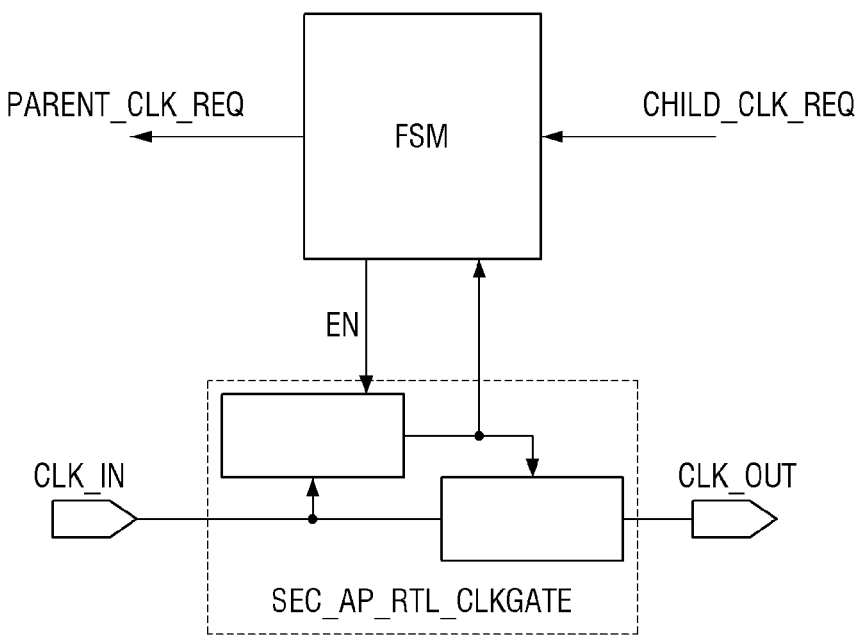
FIG. 5 is a diagram for describing an implementation method of a clock gating unit included in a semiconductor device according to some embodiments.
Figure 6:
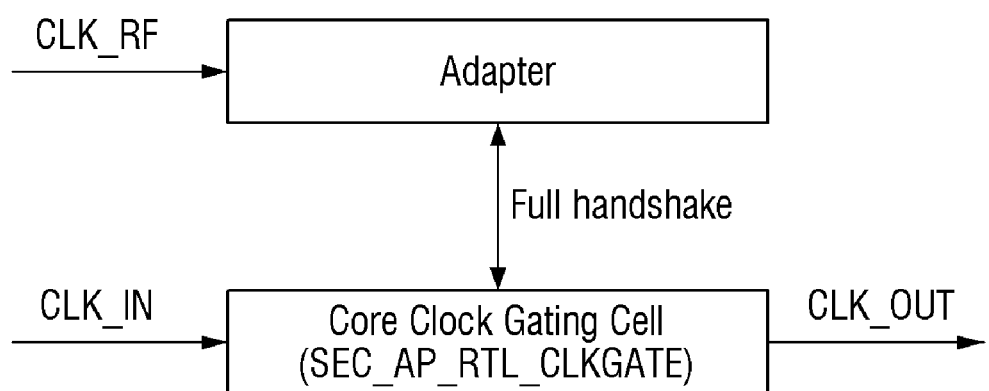
FIG. 6 is a diagram for describing a structure of a clock gating unit included in a semiconductor device according to some embodiments.
Figure 7:
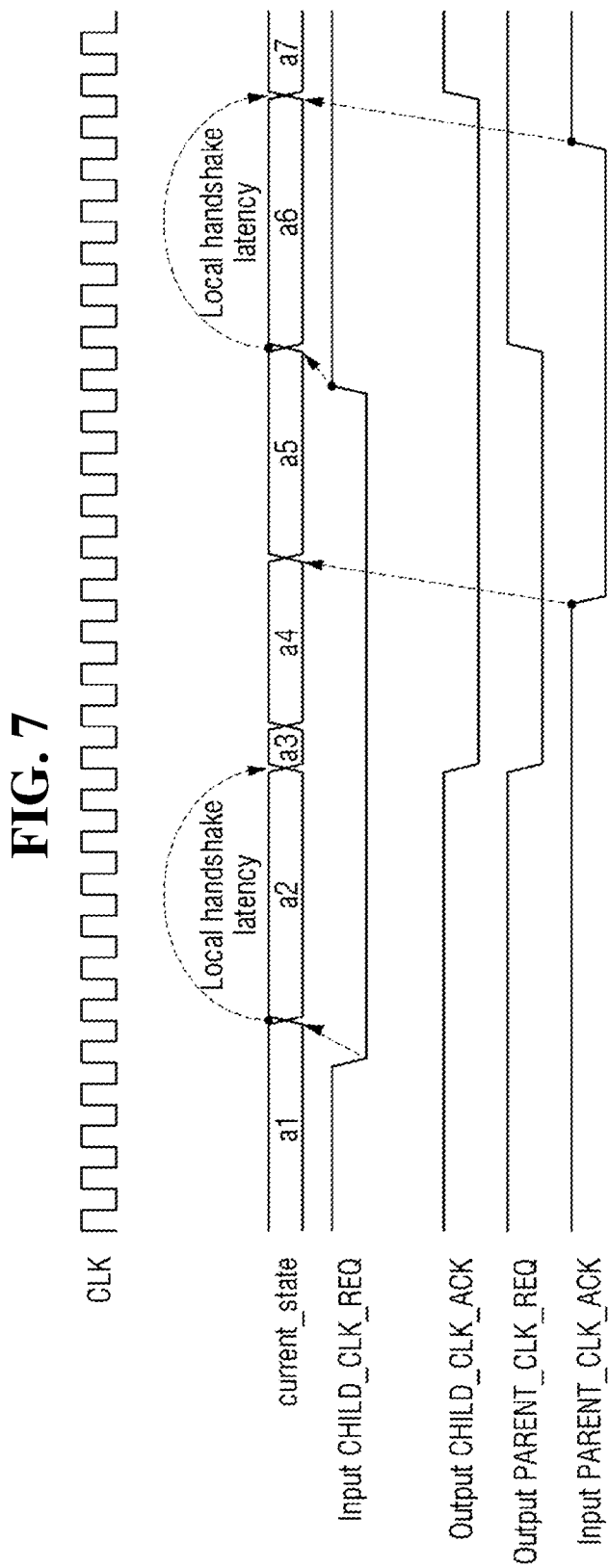
FIG. 7 is a timing diagram for describing a behavior of a clock gating unit included in a semiconductor device according to some embodiments.

FIG. 5 is a diagram for describing an implementation method of a clock gating unit included in a semiconductor device according to some embodiments. FIG. 6 is a diagram for describing a structure of a clock gating unit included in a semiconductor device according to some embodiments. FIG. 7 is a timing diagram for describing a behavior of a clock gating unit included in a semiconductor device according to some embodiments.

Referring to FIG. 5, the clock gating unit includes an FSM and a clock gating cell SEC_AP_RTL_CLKGATE. Here, the FSM means a computational model or machine including a finite number of states and transformations between the states. The FSM and the clock gating cell SEC_AP_RTL_CLKGATE of FIG. 5 may correspond to an adapter and a core clock gating cell SEC_AP_RTL_CLKGATE of FIG. 6, respectively. Here, the FSM or the adapter may operate in response to a reference clock signal CLK_RF corresponding to a different clock domain from a clock signal CLK generated by a clock component and may perform a full handshake with the clock gating cell SEC_AP_RTL_CLKGATE.

The FSM may receive a clock request signal CHILD_CLK_REQ received from a child clock component and may transmit a clock request signal PARENT_CLK_REQ to a parent clock component or output an enable signal EN for controlling the clock gating cell SEC_AP_RTL_CLKGATE according to a state of the FSM.

The clock gating cell SEC_AP_RTL_CLKGATE receives a clock signal CLK_IN according to the enable signal EN output from the FSM and outputs a clock signal CLK_OUT in which the clock signal CLK_IN is gated or bypassed.

Referring to FIG. 7, the FSM of the clock gating unit may include the following states.

A first state a1 is a state in which, according to a clock request signal CHILD_CLK_REQ having a second logical value H received from a child clock component, a clock signal CLK is provided to the child clock component without performing a clock gating operation. Thereafter, the clock request signal CHILD_CLK_REQ received from the child clock component transitions to a first logical value L.

A second state a2 is a state in which the clock gating unit performs a self-clock gating operation. Accordingly, after self-local handshake latency necessary for the self-clock gating operation elapses, the clock gating unit transmits a clock response signal CHILD_CLK_ACK having the first logical value L to the child clock component. In addition, the clock gating unit transmits a clock request signal PARENT_CLK_REQ having the first logical value L to a parent clock component.

A third state a3 corresponds to an operation in which the clock request signal PARENT_CLK_REQ having the first logical value L is transmitted to the parent clock component to transmit a clock provision stop request. A fourth state a4 is a state in which the clock gating unit waits until the clock response signal PARENT_CLK_ACK having the first logical value L for the parent clock component is received from the parent clock component. Since the clock gating unit internally completes a gating operation, when the parent clock component needs to perform a clock gating operation, this means that the parent clock component performs the clock gating operation.

After the clock response signal PARENT_CLK_ACK having the first logical value L for the parent clock component is received from the parent clock component, in a fifth state a5, provision of a clock to the child clock component of the clock gating unit is completely stopped.

In this case, when the clock request signal CHILD_CLK_REQ having the second logical value H is received from the child clock component, after the clock request signal PARENT_CLK_REQ having the second logical value H is transmitted to the parent clock component, in a sixth state a6, the clock gating unit stops the self-clock gating operation.

After a local handshake latency necessary to stop the self-clock gating operation elapses, when the clock response signal PARENT_CLK_ACK having the second logical value H is received from the parent clock component, the clock gating unit enters a seventh state a7, and here, the seventh state a7 means the first state a1.

Referring to FIGS. 1 and 2, a PMU 300 may transmit a power control signal to an oscillator in response to a wake-up signal input in a standby mode. The oscillator is an oscillation circuit that generates a constant frequency signal and provides an operation clock to a logic block. A commonly used crystal oscillator uses a piezoelectric vibration of a crystal to generate a stable and accurate frequency signal.

When power is input to the OSC, while oscillation starts, a stable oscillation clock is gradually output from a fine and unstable signal. After the oscillation clock output from the OSC is stabilized, a CMU 100 may provide an operation clock to a logic block.

Figure 8:
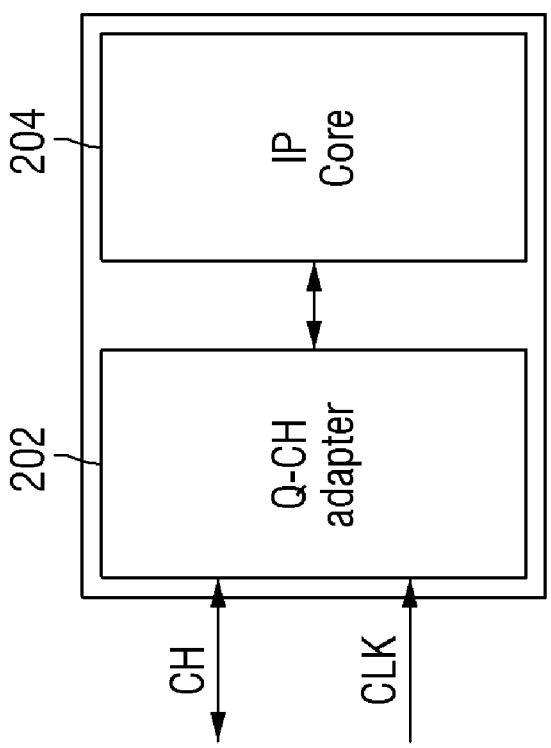
FIG. 8 is a block diagram illustrating an intellectual property (IP) block included in a semiconductor device according to some embodiments.

FIG. 8 is a block diagram illustrating an IP block included in a semiconductor device according to some embodiments.

Referring to FIG. 8, an IP block 200 may include a channel adapter 202 and an IP core 204. FIG. 8 illustrates only an example of the IP block 200, and the other IP block 210 includes substantially the same components.

Referring to FIGS. 1, 2, and 8, the channel adapter 202 may communicate with a CM 130 according to a full handshake method. Through the channel adapter 202, the IP block 200 may transmit a first clock request signal REQ1 and receive a first operation clock signal OCLK1. Alternatively, through the channel adapter 202, the IP block 200 may transmit the first clock request signal REQ1 and receive an acknowledgment signal ACK indicating that a clock is present, and the first operation clock signal OCLK1 may be provided directly from a clock component controlled by the channel adapter 202.

The IP core 204 may include, for example, a processor, a graphic processor, a memory controller, an input and output interface block, and the like.

Figure 9:
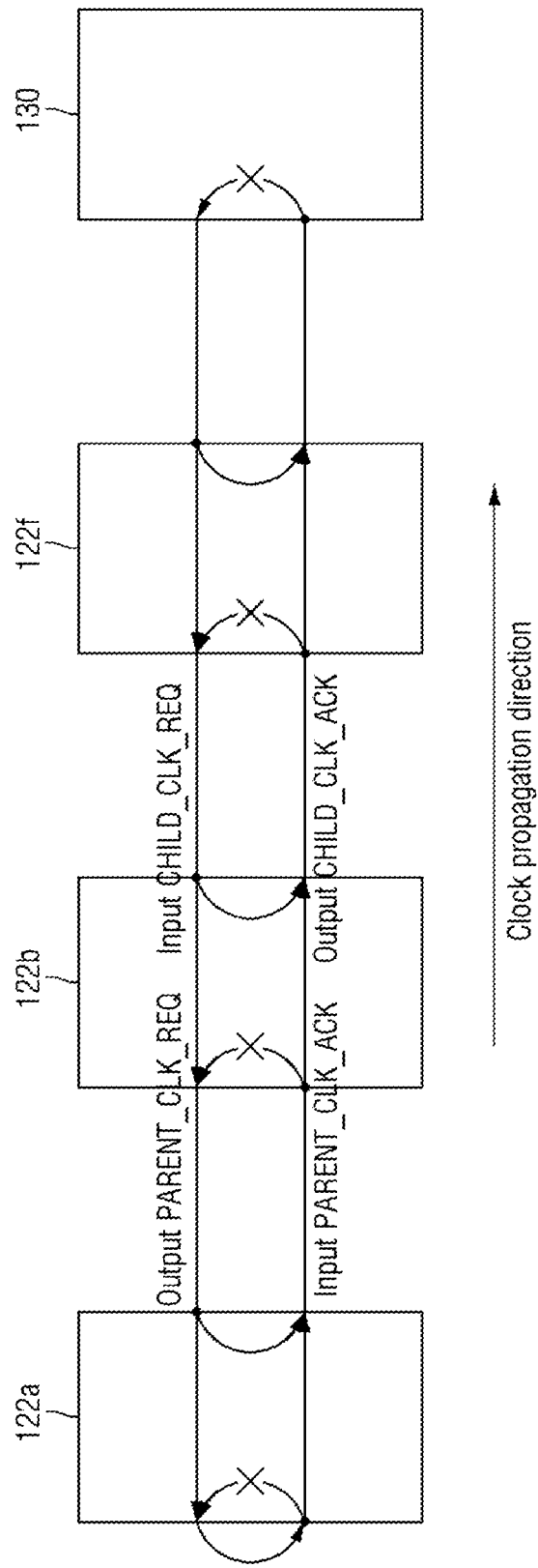
FIG. 9 is a diagram illustrating a signal transmission path between a plurality of clock control circuits.

FIG. 9 is a diagram illustrating a signal transmission path between a plurality of CCs.

Referring to FIG. 9, the plurality of CCs may operate using handshake signals including a clock request signal REQ and an acknowledgment signal ACK (or a clock response signal) that is a response signal for the clock request signal REQ. The clock request signal REQ and the clock response signal ACK may have, for example, a first logical value L and a second logical value H, but a method of implementing the clock request signal REQ and the clock response signal ACK is not limited thereto.

In some embodiments, for example, a clock consumer may transmit the clock request signal REQ having the second logical value H to a clock provider to transmit information, which indicates that a clock is required, to the clock provider. Alternatively, for example, the clock consumer may transmit the clock request signal REQ having the first logical value L to the clock provider to transmit information, which indicates that a clock is no longer required, to the clock provider.

Meanwhile, for example, the clock provider may transmit the clock response signal ACK having the second logical value H to the clock consumer, which indicates that a clock signal is stably supplied to the clock consumer from the clock provider. Therefore, the clock provider may transmit the clock response signal ACK having the first logical value L to the clock consumer, which indicates that the clock provider cannot inform the clock consumer of whether the clock signal is provided.

For example, a CC 122b as a clock consumer may transmit, for example, a clock request signal PARENT_CLK_REQ having the second logical value H to a CC 122a, thereby transmitting information, which indicates that a clock is required, to the CC 122a corresponding to the clock provider. Thus, a clock component (that is, a clock provider) including the CC 122a provides a clock signal to a clock component (that is, a clock consumer) including the CC 122b, and then, the CC 122b may receive, for example, a clock response signal PARENT_CLK_ACK having the second logical value H from the CC 122a.

Meanwhile, the CC 122b as a clock provider may receive a clock request signal CHILD_CLK_REQ having the second logical value H from a CC 122f, thereby knowing that the CC 122f corresponding to a clock consumer requires a clock. Accordingly, a clock component (that is, a clock provider) including the CC 122b may provide a clock signal to a clock component (that is, a clock consumer) including the CC 122f, and then, the CC 122b as the clock provider may transmit, for example, a clock response signal CHILD_CLK_ACK having the second logical value H to the CC 122f.

As another example, the CC 122b as a clock consumer may transmit, for example, the clock request signal PARENT_CLK_REQ having the first logical value L to the CC 122a, thereby transmitting information, which indicates that a clock is no longer required, to the CC 122a corresponding to a clock provider. Accordingly, the CC 122b may receive, for example, the clock response signal PARENT_CLK_ACK having the first logical value L from the CC 122a, which indicates that provision of a clock from a clock provider is not ensured.

Meanwhile, the CC 122b as a clock provider may receive, for example, the clock request signal CHILD_CLK_REQ having the first logical value L from the CC 122f, thereby knowing that the CC 122f corresponding to a clock consumer no longer requires a clock. Accordingly, the CC 122b may transmit, for example, the clock response signal CHILD_CLK_ACK having the first logical value L to the CC 122*f*, which indicates that provision of a clock from a clock provider is not ensured.

Here, a combination path between the CCs includes a path through which the CC 122*b* transmits the clock request signal PARENT_CLK_REQ to the CC 122*a* corresponding to a parent thereof, and then the CC 122*b* receives the clock response signal PARENT_CLK_ACK from the CC 122*a* corresponding to the parent thereof and a path through which the CC 122*b* receives the clock request signal CHILD_CLK_REQ from the CC 122*f* corresponding to a child thereof, and then the CC 122*b* transmits the clock response signal CHILD_CLK ACK to the CC 122*f* corresponding to the child thereof. However, the combination path between the CCs does not include a path through which the CC 122*b* receives the clock response signal PARENT_CLK_ACK from the CC 122*a* corresponding to the parent thereof, and then the CC 122*b* transmits the clock request signal PARENT_CLK_REQ to the CC 122*a* corresponding to the parent thereof (shown as "X" in FIG. 9).

The clock request signal REQ and the clock response signal ACK are implemented in a general full handshake method, and a clock provider and a clock consumer may belong to the same single clock domain and may belong to different clock domains.

In some embodiments of the present disclosure, a clock MUX circuit, a clock dividing circuit, a clock gating circuit, or the like which is connected to and communicates with each CC may use a clock domain different from that of the CC. That is, a clock frequency of a signal line for transmitting a clock request signal may be different from a clock frequency of an actually received operation clock.

Referring to FIGS. 1, 2 and 9, a full handshake method is summarized as follows.

When an IP block 200 requires a clock, the IP block 200 activates a first clock request signal REQ1. For example, the IP block 200 may make the first clock request signal REQ1 into a high state.

A CMU 100 activates a first clock response signal ACK1 for the first clock request signal REQ1 in response to the activation of the first clock request signal REQ1. That is, the CMU 100 may make the first clock response signal ACK1 into a high state.

The CMU 100 may transmit a first operation clock signal OCLK1 to the IP block 200 before the first clock response signal ACK1 is activated. Alternatively, the CMU 100 may transmit the first clock signal OCLK1 to the IP block 200 simultaneously with the activation of the first clock response signal ACK1.

When the IP block 200 does not require a clock, the first clock request signal REQ1 is deactivated. That is, the IP block 200 may make the first clock request signal REQ1 into a low state.

When the first clock request signal REQ1 is in a low state, the CMU 100 makes the first clock response signal ACK1 into a low state. The CMU 100 may deactivate the first operation clock signal OCLK1 at the same time.

The IP block 200 may operate normally while the first clock response signal ACK1 is in an active state.

Furthermore, each of CCs 122*a*, 122*b*, 122*c*, 122*d*, 122*e*, 122*f*, and 122*g* may also perform communication according to a full handshake method. For example, each of the CCs 122*a* and 122*b* may support a full handshake method between a clock component 120*a* that is a PLL controller and a clock component 120*b* that is a clock MUX unit.

Each of the CCs 122*b* and 122*c* may support a full handshake method between, for example, the clock component 120*b* that is the clock MUX unit and a clock component 120*c* that is a first clock dividing unit.

Each of the CCs 122*c* and 122*d* may support a full handshake method between, for example, the clock component 120*c* that is the first clock dividing unit and a clock component 120*d* that is a short stop circuit.

Each of the CCs 122*d* and 122*e* may support a full handshake method between, for example, the clock component 120*d* that is the short stop circuit and a clock component 120*e* that is a second clock dividing unit.

Each of the CCs 122*e* and 122*f* may support a full handshake method between, for example, the clock component 120*e* that is the second clock dividing unit and a clock component 120*f* that is a first clock gating unit.

Similarly, each of the CCs 122*f* and a CM 130 may support a full handshake method between, for example, the clock component 120*f* that is the first clock gating unit and the CM 130.

In some embodiments, each of the clock components 120*a*, 120*b*, 120*c*, 120*d*, 120*e*, 120*f*, and 120*g* and CMs 130 and 132 may be implemented as a combinational circuit. Thus, an activated clock request signal can be transmitted from the CMs 130 and 132 to the clock component 120*a*, which is, for example, a PLL controller.

Referring again to FIG. 2, a DVFS block 400 may perform a DVFS operation on IP blocks 200 and 210 using a CPM 410.

Figure 10:
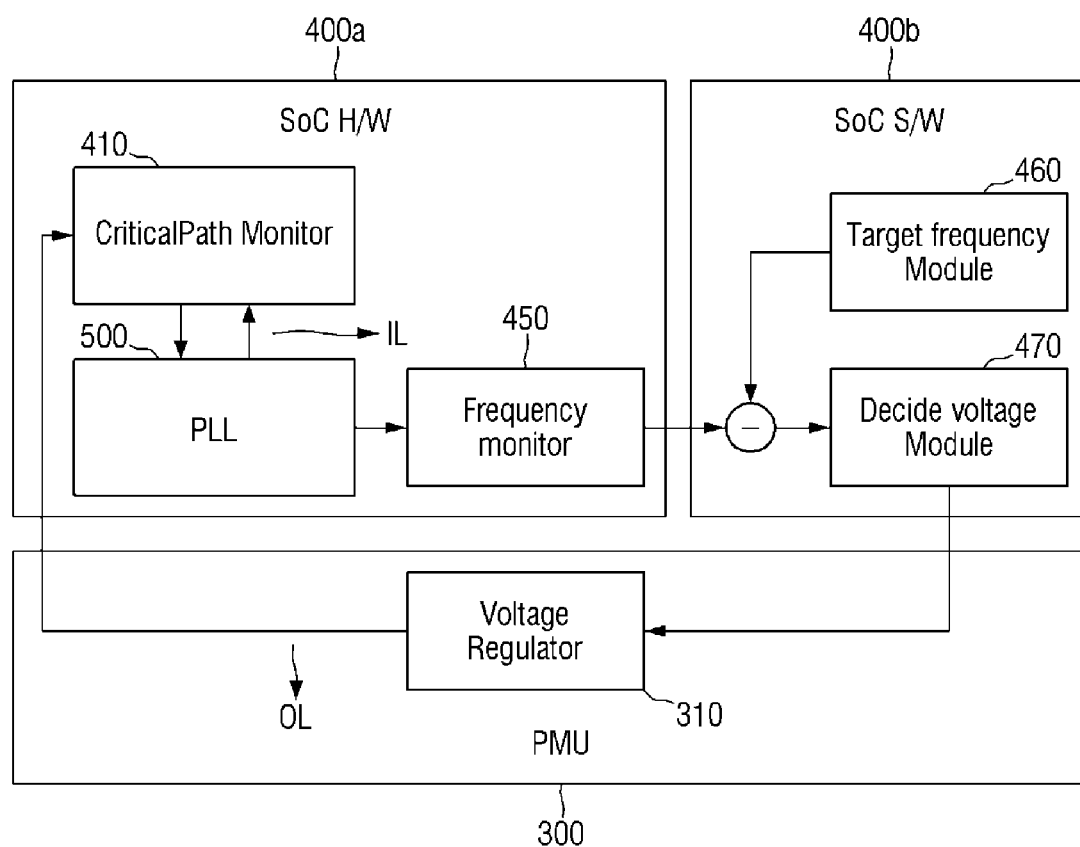
FIG. 10 is a conceptual diagram illustrating the operation of a dynamic voltage frequency scaling (DVFS) block.
Figure 11:
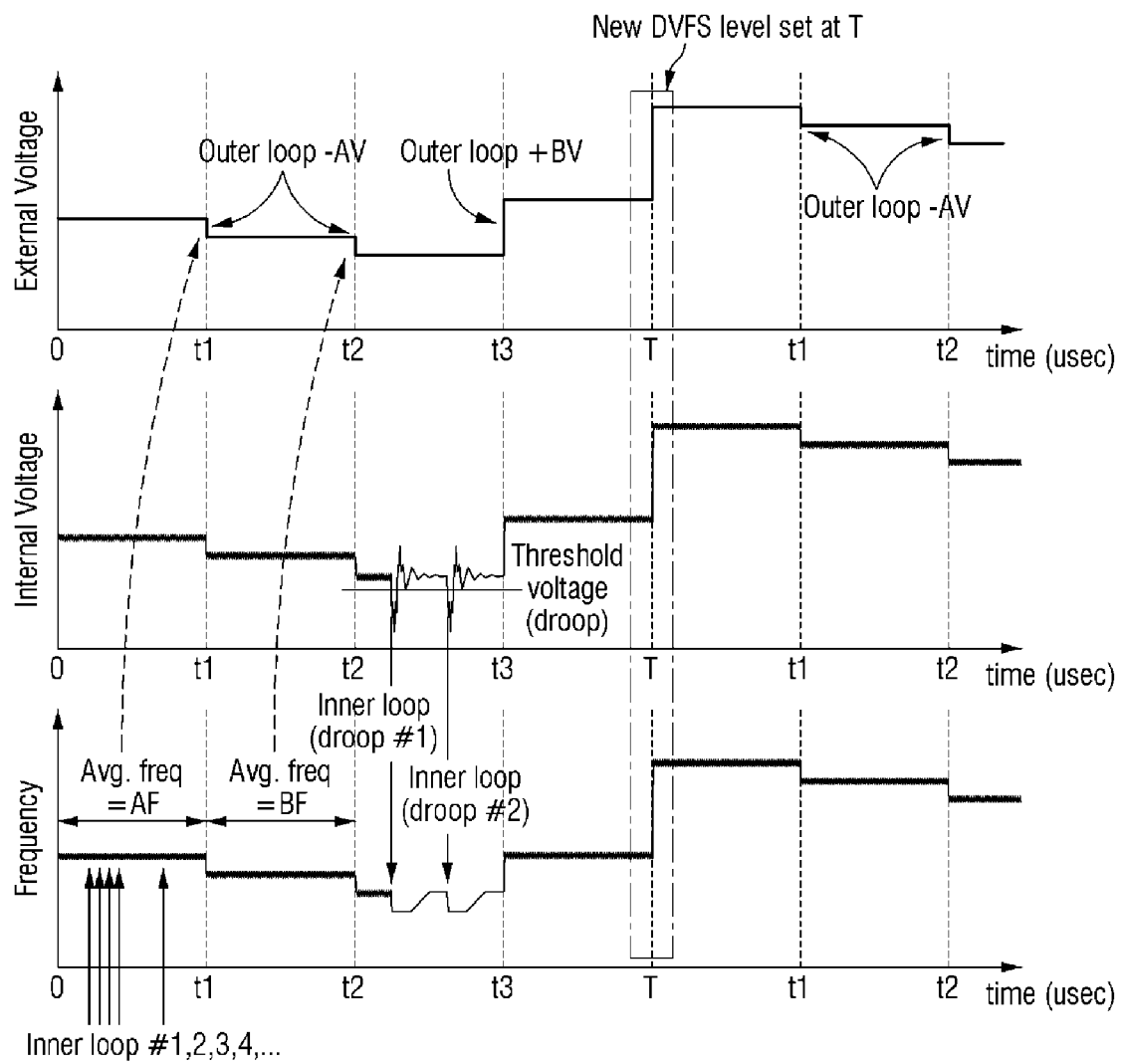
FIG. 11 is a timing diagram illustrating the operation of a DVFS block.

FIG. 10 is a conceptual diagram illustrating the operation of a DVFS block. FIG. 11 is a timing diagram illustrating the operation of a DVFS block.

Referring to FIG. 10, the DVFS block may include a hardware block 400*a* implemented as hardware and a software block 400*b* implemented as software.

A CPM 410 and a PLL 500 may constitute an inner loop IL.

In the inner loop IL, for each period of the inner loop IL, the CPM 410 may monitor an operating speed of a circuit. A monitoring result of the CPM 410 may be fed back to the PLL 500 for each period of the inner loop IL to change a frequency of a clock.

Hereinafter, a configuration in which the CPM 410 changes a frequency of a clock using the PLL 500 for each inner loop period will be described.

Referring to FIGS. 2, 10, and 11, the CPM 410 may monitor a clock signal CLK1 provided to an IP block for each inner loop period (inner loop #1, #2, #3, #4, or the like of FIG. 11) to generate a code CODE1 related to an operating speed of a circuit.

The code CODE1 may be provided to a clock component 120*a* which controls the PLL 500, and when a frequency of a PLL output clock signal PLLCK of the PLL 500 needs to be changed according to the code CODE1, the clock component 120*a* may generate a control signal CTL related thereto to apply the generated control signal CTL to the PLL 500 so that the frequency of the PLL output clock signal PLLCK of the PLL 500 may be changed. As described above, when the frequency of the PLL output clock signal PLLCK of the PLL 500 is changed, both of a frequency of the output clock signal CLK1 of the clock component 120*a* and frequencies of output clock signals CLK of clock components 120*b*, 120*c*, 120*d*, and 120*e* may be changed, and thus, finally, a frequency of an operation clock signal OCLK1 provided to an IP block 200 may also be changed.

The CPM 410, the PLL 500, a frequency monitor 450, a target frequency determination module 460, a voltage determination module 470, a voltage regulator 310, and the like may constitute an outer loop OL.

Referring to FIGS. 10 and 11, the operation of the outer loop OL may be performed for a period (see t1, t2, or t3 of FIG. 11) that is longer than the inner loop period. That is, a plurality of inner loop operations may be performed within one period of the outer loop OL.

The inner loop operation may be performed a plurality of times at an average frequency AF as a target until a time point t1, and at the time point t1, when the voltage determination module 470 determines a supply voltage of a next period based on outputs of the frequency monitor 450 and the target frequency determination module 460, the voltage regulator 310 may change a voltage to change the supply voltage. Accordingly, after the time point t1, a voltage reduced by a voltage AV from that before the time point t1 may be supplied.

Thereafter, the inner loop operation may be performed a plurality of times at an average frequency BF as a target until a time point t2, and at the time point t2, when the voltage determination module 470 determines a supply voltage of a next period based on outputs of the frequency monitor 450 and the target frequency determination module 460, the voltage regulator 310 may change a voltage to change the supply voltage. Accordingly, after the time point t2, a voltage reduced once more by the voltage AV from that before the time point t2 may be supplied.

Next, when a voltage droop occurs while the inner loop operation is performed a plurality of times until a time point t3, the inner loop changes a clock frequency to compensate for the voltage droop. Then, at the time point t3, when the voltage determination module 470 determines a supply voltage of a next period based on outputs of the frequency monitor 450 and the target frequency determination module 460, the voltage regulator 310 may change a voltage to the supply voltage. Accordingly, after the time point t3, a voltage increased by a voltage BV from that before the time point t3 may be provided to compensate for the voltage droop.

The operation of the outer loop OL may be newly set for each period T. That is, a new DVFS level may be set for each period T.

In some embodiments, an operation period of the outer loop OL may be longer than an operation period of the inner loop IL, and a period at which the DVFS level is newly set may be longer than the operation period of the outer loop OL.

The operations of the CPM 410 and the IP block 200, for example, the operation of the DVFS block 400 has been described above, but the CPM 410 and an IP block 210 may also operate in the same manner.

Referring to FIG. 2, a CPM clock manager 140a may perform clock gating for a CPM 410.

In some embodiments, the CPM clock manager 140a may be implemented in a form similar to the clock components 120a, 120b, 120c, 120d, 120e, 120f, and 120g described above. That is, the CPM clock manager 140a may include a CC and a CS. The CPM clock manager 140a may form a clock chain as illustrated together with the clock components 120a, 120b, 120c, 120d, 120e, 120f, and 120g.

The CPM clock manager 140a may provide the clock signal CLK1 output from the clock component 120a to the CPM 410. In this case, the CS of the CPM clock manager 140a may provide the clock signal CLK1 output from the clock component 120a to the CPM 410 without separately processing the clock signal CLK1 output from the clock component 120a.

The CPM clock manager 140a may transmit a request signal REQ, which indicates a stop request for provision of the clock signal CLK1, to the CPM 410 under control of a CMU 100 or a CMU controller 110.

The CPM 410 receiving the request signal REQ transmits, after a task that is being processed is completed, a response signal ACK, which indicates that the clock signal may be stopped, to the CPM clock manager 140a. After receiving the response signal ACK from the CPM 410, the CPM clock manager 140a requests a clock component corresponding to a parent thereof (the clock component 120a in the present example) to stop provision of the clock signal.

Figure 12:
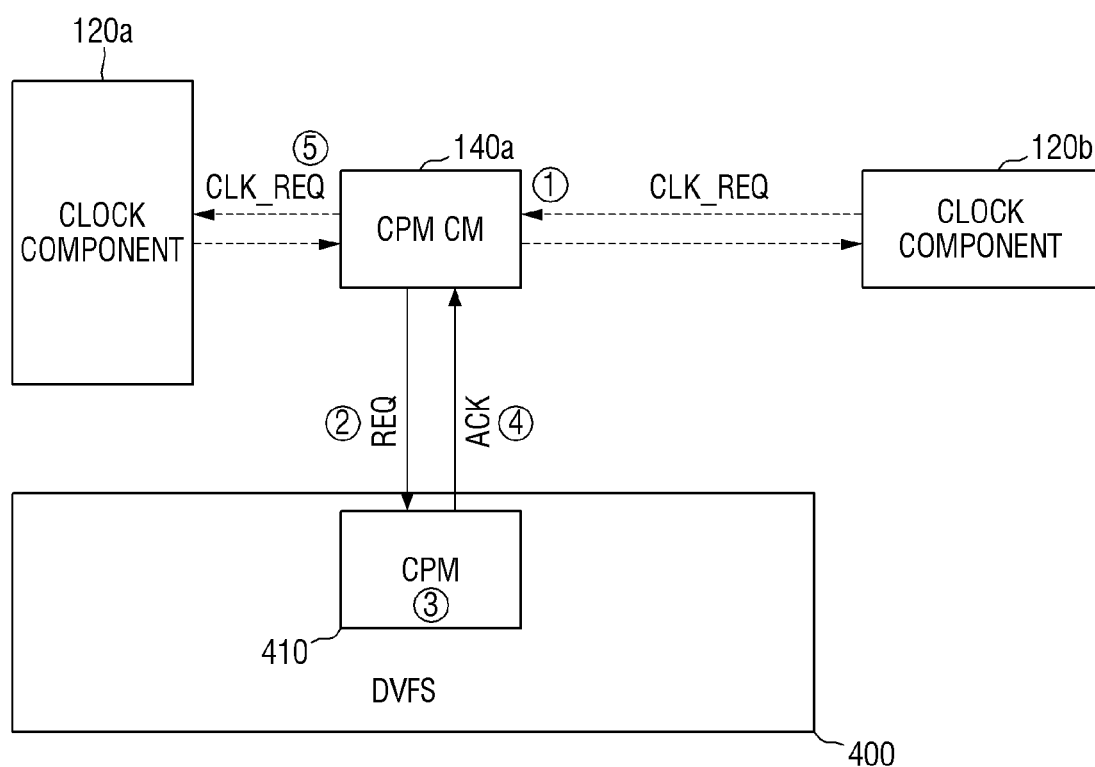
FIGS. 12 and 13 are diagrams for describing the operations of a critical path monitor (CPM) clock manager and a CPM.
Figure 13:
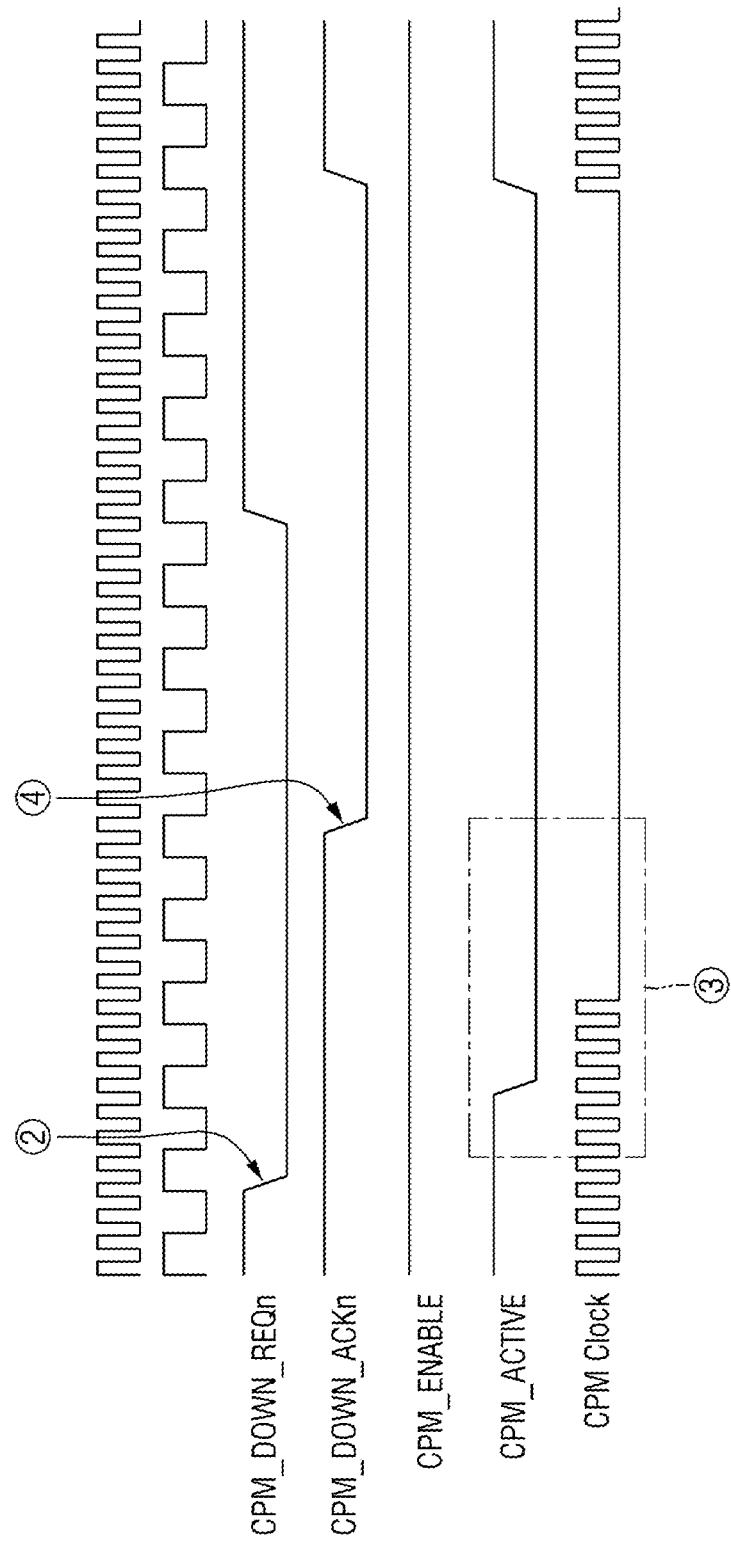

FIGS. 12 and 13 are diagrams for describing the operations of a CPM clock manager and a CPM.

First, referring to FIGS. 2 and 12, a clock component 120b, which is a child, transmits a clock request signal CLK_REQ for requesting to stop a clock signal to a CPM clock manager 140a, which is a parent (①). This may be because, for example, an IP block 200 has requested a clock signal stop so as to enter a sleep mode. Accordingly, the CPM clock manager 140a may know that the IP block 200 has requested the clock signal stop through the clock component 120b.

As described, when the IP block 200 enters the sleep mode, monitoring of the IP block 200 is not required. Accordingly, the CPM clock manager 140a transmits the request signal REQ, which indicates a stop request for provision of the clock signal, to the CPM 410 (②).

Referring to FIG. 13, in some embodiments, the CPM clock manager 140a may provide, for example, a clock stop request signal CPM_DOWN_REQn having a first logical value L to the CPM 410.

Referring to FIGS. 12 and 13, the CPM 410 receiving the clock stop request signal CPM_DOWN_REQn having the first logical value L performs a clean-up operation of completing a task that is being processed (③).

Specifically, the CPM 410 may stop the operation of a pattern generator disposed therein and may flush a previously generated code or the like to the outside.

In some embodiments, the CPM clock manager 140a may provide a clock signal CLK1 to the CPM 410 until the clean-up operation of the CPM 410 is fully completed. In addition, in some embodiments, the CPM clock manager 140a may provide the clock signal CLK1 to the CPM 410 while the CPM 410 maintains an active state which is an active signal CPM_ACTIVE maintains a second logical value H. Furthermore, in some other exemplary embodiments, until a certain time point after providing, for example, the clock stop request signal CPM_DOWN_REQn having the first logical value L, the CPM clock manager 140a may provide the clock signal CLK1 to the CPM 410.

In the present exemplary embodiment, even if the clock signal CLK1 is not provided to the CPM 410, the CPM 410 is not disabled. As illustrated in FIG. 13, the CPM 410 continuously maintains an enabled state by an enable signal CPM_ENABLE, but a clock signal CPM Clock necessary for a monitoring operation of the CPM 410 is not provided.

When the clean-up operation is fully completed, the CPM 410 transmits an acknowledgment signal ACK, which indicates that the clean-up operation is completed, to the CPM clock manager 140a (④).

Referring to FIG. 13, in some embodiments, the CPM 410 may provide, for example, a clock stop request signal CPM_DOWN_ACKn having the first logical value L to the CPM clock manager 140a.

The CPM clock manager 140a receiving a response signal ACK from the CPM 410 transmits the clock request signal CLK_REQ for requesting to stop a clock signal to a clock component 120a that is a parent (⑤).

In a semiconductor device 1 according to the present exemplary embodiment, during a section in which, since a clock signal is not provided to the IP block 200 according to such an operation, the CPM 410 does not need to operate (that is, a section in which the CPM 410 does not need to perform monitoring), provision of a clock signal to the CPM 410 is stopped, thereby effectively reducing power consumption during an operation of the semiconductor device.

Although only the operations of one CPM 410 and one CPM clock manager 140a have been described above, exemplary embodiments are not limited thereto. In some embodiments, a DVFS block 400 may include a first CPM for monitoring a clock provided to a first IP block 200 to adjust a frequency of a first operation clock signal OCLK1 provided to the first IP block 200 and a second CPM for monitoring a clock provided to a second IP block 210 to adjust a frequency of a second operation clock signal OCLK2 provided to the second IP block 210. The exemplary embodiment may be modified such that a CMU 100 also includes a first CPM clock manager for performing clock gating for the first CPM and a second CPM clock manager for performing clock gating for the second CPM.

Figure 14:
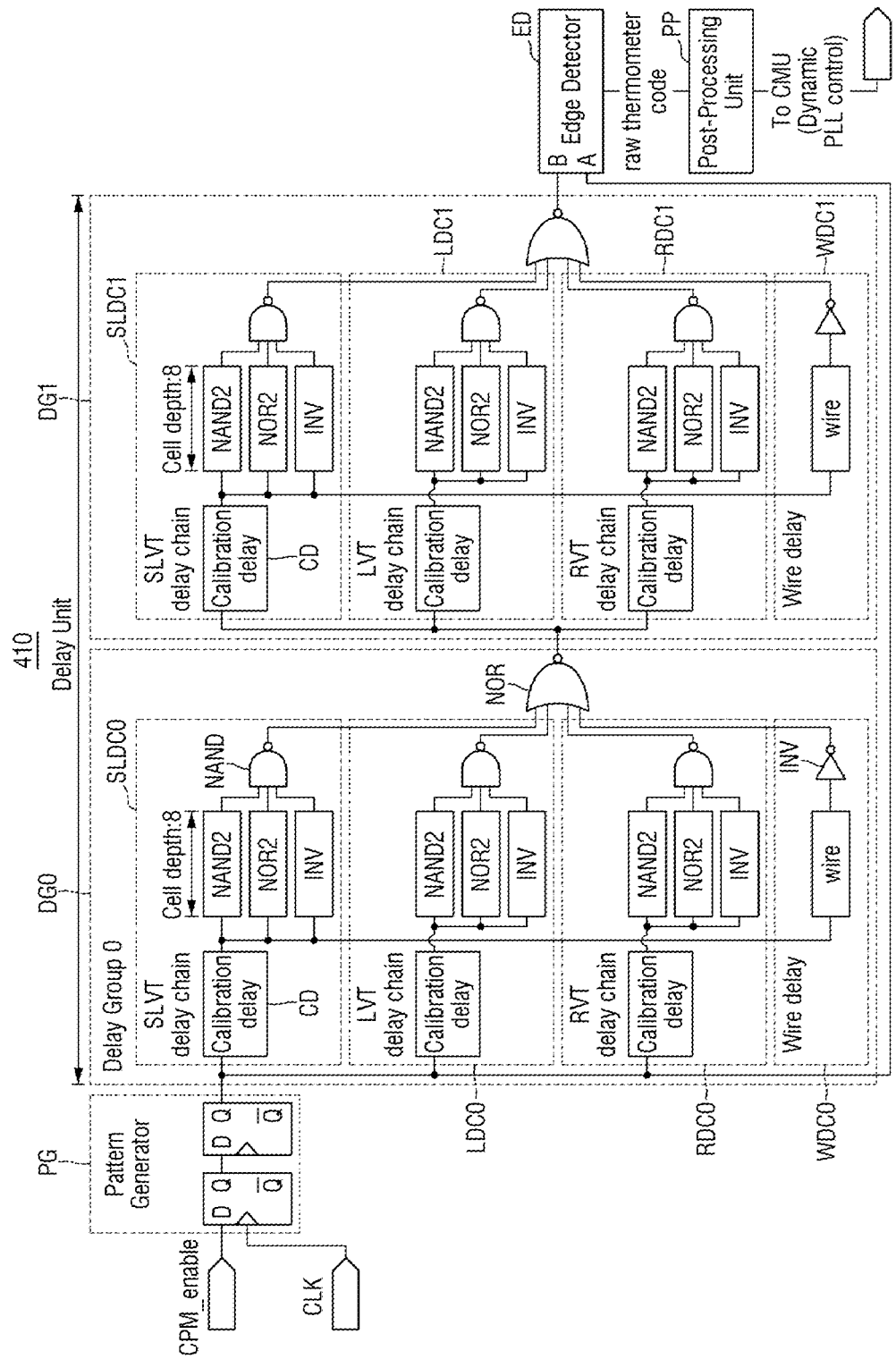
FIG. 14 is a diagram illustrating a structure of a CPM according to some embodiments.
Figure 15:
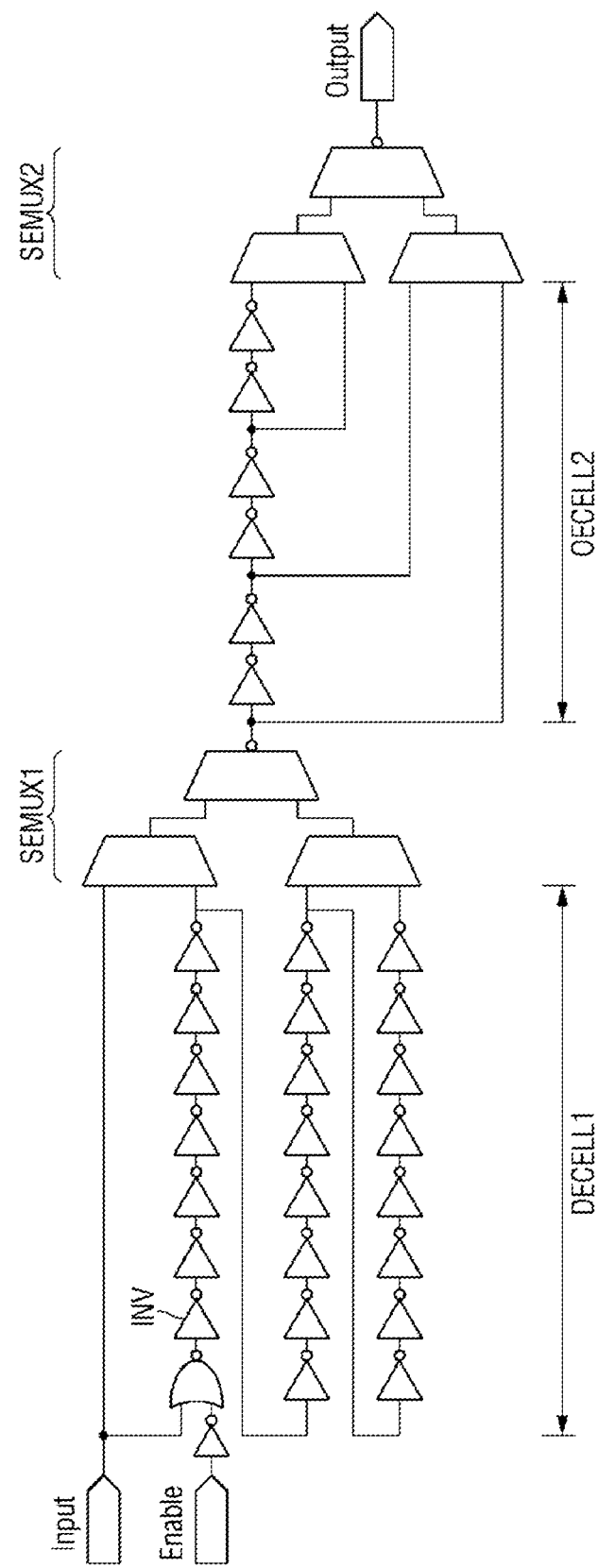
FIG. 15 is an exemplary block diagram of a calibration delay circuit of FIG. 14.
Figure 16:
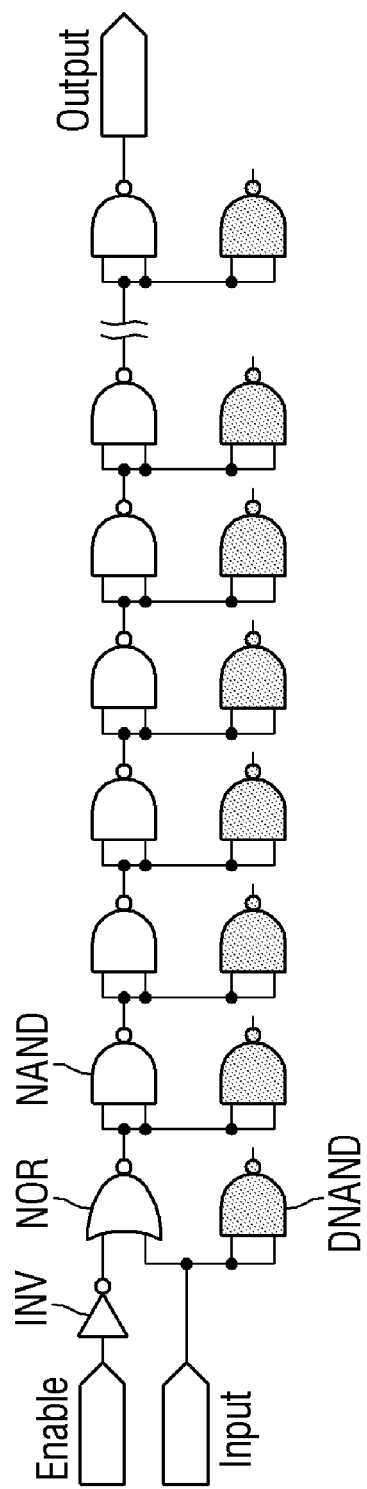
FIG. 16 is an exemplary block diagram of a NAND delay circuit of FIG. 14.
Figure 17:
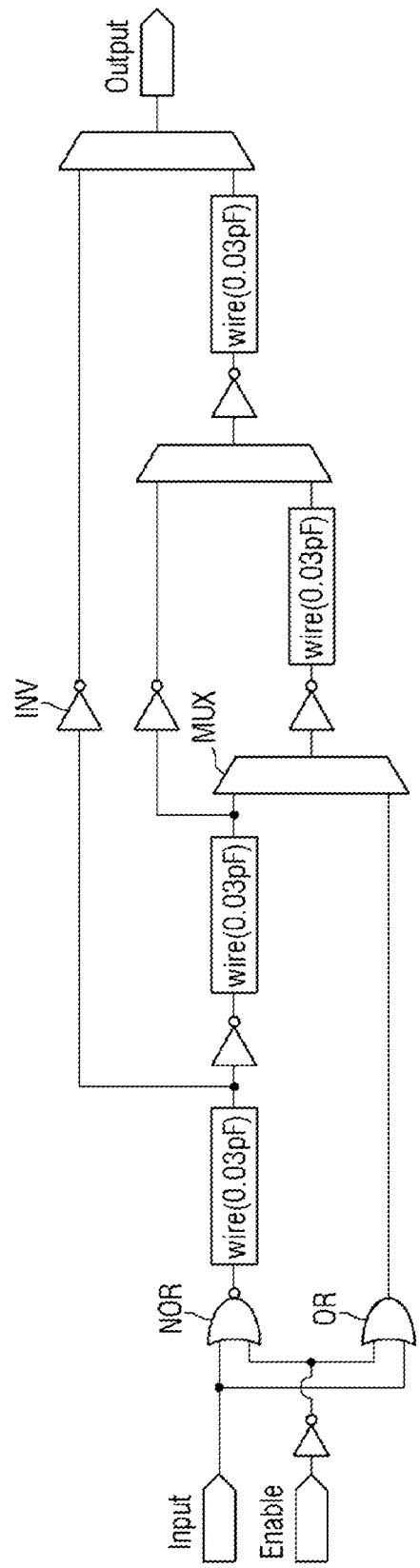
FIG. 17 is an exemplary block diagram of a wire delay circuit of FIG. 14.
Figure 18:
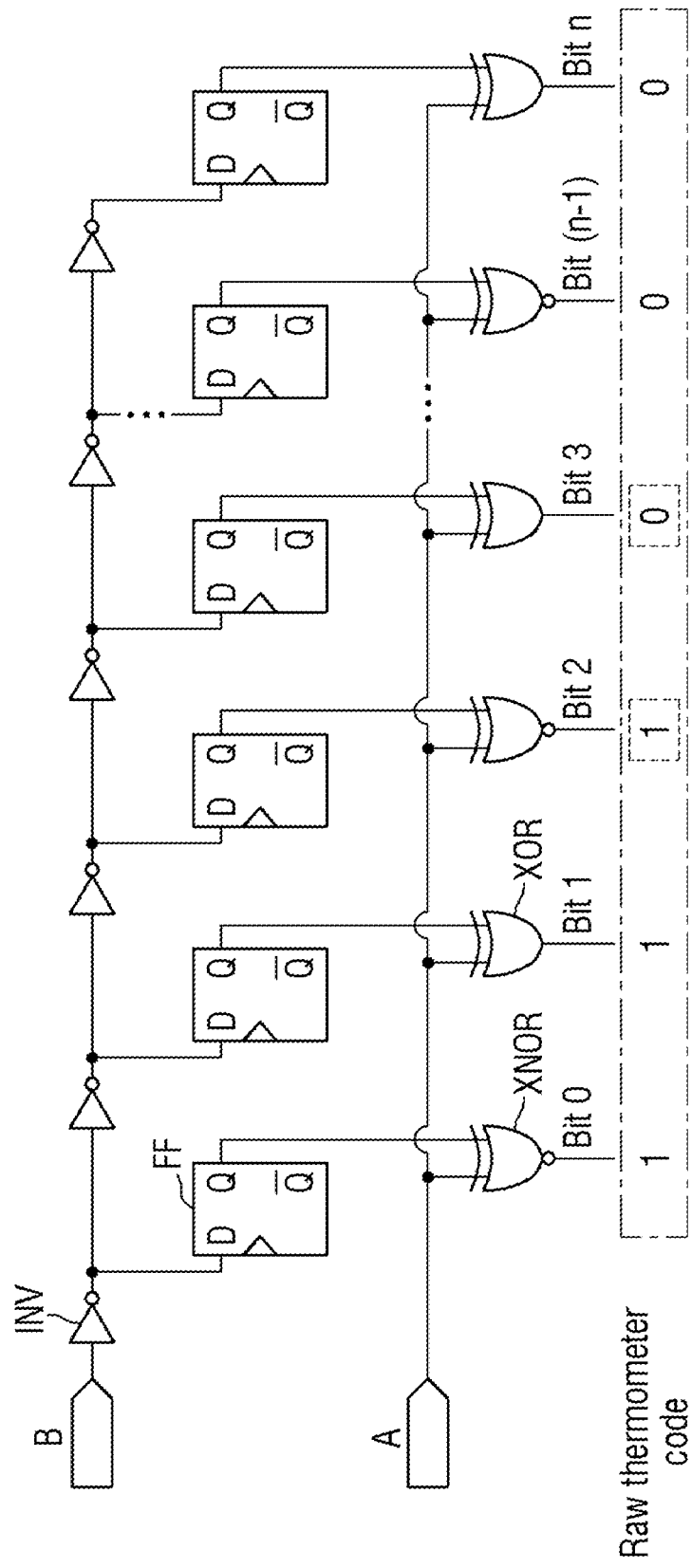
FIG. 18 is an exemplary block diagram of an edge detector of FIG. 14.
Figure 19:
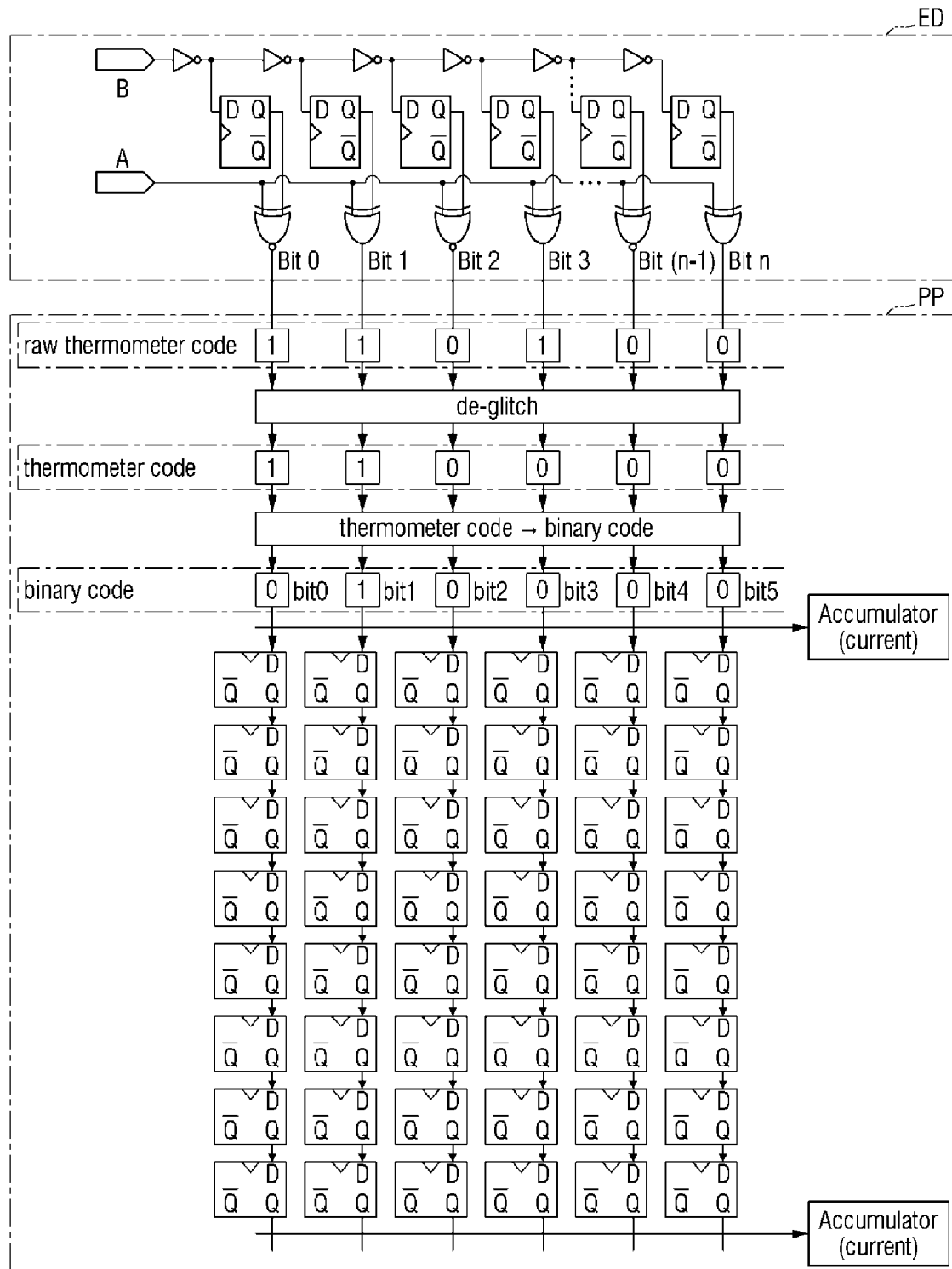
FIG. 19 is an exemplary block diagram of a post processor of FIG. 14.
Figure 20:
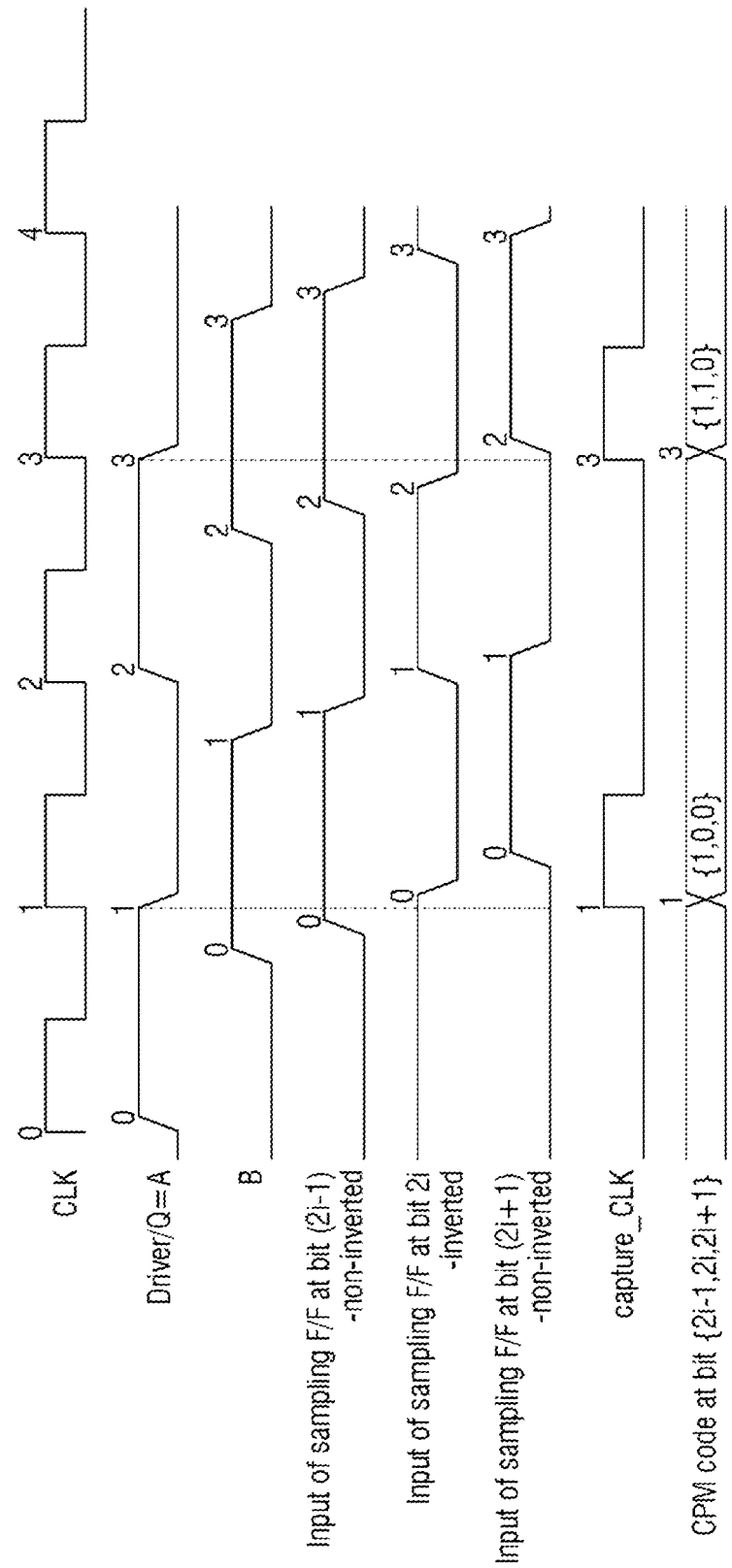
FIG. 20 is a timing diagram for describing an operation method of a CPM.

FIG. 14 is a diagram illustrating a structure of a CPM according to some embodiments. FIG. 15 is an exemplary block diagram of a calibration delay circuit of FIG. 14. FIG. 16 is an exemplary block diagram of a NAND delay circuit of FIG. 14. FIG. 17 is an exemplary block diagram of a wire delay circuit of FIG. 14. FIG. 18 is an exemplary block diagram of an edge detector of FIG. 14. FIG. 19 is an exemplary block diagram of a post processor of FIG. 14. FIG. 20 is a timing diagram for describing an operation method of a CPM.

Referring to FIG. 14, a CPM 410 may include a pattern generator PG, first and second delay groups DG0 and DG1, an edge detector ED, and a post processor PP.

The CPM 410 may receive a clock signal CLK1 (see FIG. 2) from a CMU 100 (see FIG. 2) and may monitor an operating speed of a semiconductor circuit based on the received clock signal CLK1.

Referring to FIGS. 14 and 20, the pattern generator PG may generate a pattern signal A (see FIG. 18) based on a received clock signal CLK. The pattern signal A generated from the pattern generator PG may be provided to the edge detector ED.

The first delay group DG0 may perform a first delay on the pattern signal A generated from the pattern generator PG, and the second delay group DG1 may perform a second delay on an output of the first delay group DG0 to provide a delayed pattern signal B to the edge detector ED.

In some embodiments, the first delay group DG0 and the second delay group DG1 may include substantially the same components. Accordingly, the description of the first delay group DG0, which will be described below, may be equally applied to the second delay group DG1.

The first delay group DG0 may include a first delay chain SLDC0, a second delay chain LDC0, a third delay chain RDC0, and a fourth delay chain WDC0.

In some embodiments, transistors constituting the first delay chain SLDC0, the second delay chain LDC0, and the third delay chain RDC0 may have different threshold voltages.

For example, the threshold voltage of the transistor constituting the first delay chain SDLC0 may be lower than the threshold voltage of the transistor constituting the second delay chain LDC0. In addition, the threshold voltage of the transistor constituting the second delay chain LDC0 may be lower than the threshold voltage of the transistor constituting the third delay chain RDC0.

In some embodiments, the transistors having the different threshold voltages may be formed by applying different impurity concentrations to sources and drains of the transistors. That is, for example, the impurity concentration of the source and drain of the transistor constituting the first delay chain SLDC0 may be applied to be different from the impurity concentration of the source and drain of the transistor constituting the second delay chain LDC0, and the impurity concentration of the source and drain of the transistor constituting the second delay chain LDC0 may be applied to be different from the impurity concentration of the source and the drain of the transistor constituting the third delay chain RDC0, thereby implementing the transistors so as to have different threshold voltages. However, exemplary embodiments are not limited thereto, and a method of implementing the transistors so as to have different threshold voltages is not limited thereto.

Referring to FIGS. 14 and 15, each of the first delay chain SLDC0, the second delay chain LDC0, and the third delay chain RDC0 may include a calibration delay circuit CD.

The calibration delay circuit CD may include a first delay cell DECELL1 including a plurality of inverters INV and a second delay cell DECELL2 including a plurality of inverters INV. An output of the first delay cell DECELL1 may be selected by a first selection MUX SEMUX1 and transferred to the second delay cell DECELL2. An output of the second delay cell DECELL2 may be selected by a second selection MUX SEMUX2 and transferred to the outside.

The calibration delay circuit CD may serve to adjust an amount of a calibration delay to calibrate a value of a code CODE1 (see FIG. 2) generated by the CPM 410.

Referring to FIG. 14, an output of the calibration delay circuit CD may be provided to a NAND delay circuit NAND2, a NOR delay circuit NOR2, an inverter delay circuit INV, and a wire delay circuit wire.

Referring to FIGS. 14 and 16, the NAND delay circuit NAND2 may include a delay cell including a plurality of NAND gates NAND, a NOR gate NOR, and an inverter INV. The NOR gate NOR may be inserted to prevent toggling that may occur inside the NAND delay circuit NAND2 when the NAND delay circuit NAND2 is disabled. A dummy NAND gate DNAND of the NAND delay circuit NAND2 may be inserted to increase load capacitance.

Referring to FIGS. 14 and 17, the wire delay circuit wire may include a NOR gate NOR, an OR gate OR, an inverter INV, a MUX, and a plurality of wire delay lines.

Referring to FIG. 14, in some embodiments, the CPM 410 may activate any one of the first delay chain SLDC0, the second delay chain LDC0, the third delay chain RDC0, and the fourth delay chain WDC0 included in the first delay group DG0 through a predetermined control signal.

Referring to FIGS. 14 and 20, for example, when an IP block 200 (see FIG. 2) operates in a first state, the CPM 410 may perform a first delay on the pattern signal A generated from the pattern generator PG through the first delay chain SLDC0 to provide the pattern signal A to the NOR gate NOR. In addition, when the IP block 200 (see FIG. 2) operates in a second state, the CPM 410 may perform a first delay on the pattern signal A generated from the pattern generator PG through the second delay chain LDC0 to provide the pattern signal A to the NOR gate NOR. Furthermore, when the IP block 200 (see FIG. 2) operates in a third state, the CPM 410 may perform a first delay on the pattern signal A generated from the pattern generator PG through the third delay chain RDC0 to provide the pattern signal A to the NOR gate NOR. In addition, when the IP block 200 (see FIG. 2) operates in a fourth state, the CPM 410 may perform a first delay on the pattern signal A generated from the pattern generator PG through the fourth delay chain WDC0 to provide the pattern signal A to the NOR gate NOR.

In some embodiments, the CPM 410 may activate the same delay chains in the first delay group DG0 and the second delay group DG1. For example, when the IP block 200 (see FIG. 2) operates in the first state, the CPM 410 may perform first and second delays on the pattern signal A generated from the pattern generator PG through first delay chains SLDC0 and SLDC1 to provide the pattern signal A to the edge detector ED in the form of the delayed pattern signal B. In addition, when the IP block 200 (see FIG. 2) operates in the second state, the CPM 410 may perform first and second delays on the pattern signal A generated from the pattern generator PG through second delay chains LDC0 and LDC1 to provide the pattern signal A to the edge detector ED in the form of the delayed pattern signal B. Furthermore, when the IP block 200 (see FIG. 2) operates in the third state, the CPM 410 may perform first and second delays on the pattern signal A generated from the pattern generator PG through third delay chains RDC0 and RDC1 to provide the pattern signal A to the edge detector ED in the form of the delayed pattern signal B. In addition, when the IP block 200 (see FIG. 2) operates in the fourth state, the CPM 410 may perform first and second delays on the pattern signal A generated from the pattern generator PG through fourth delay chains WDC0 and WDC1 to provide the pattern signal A to the edge detector ED in the form of the delayed pattern signal B.

In some embodiments, the CPM 410 may activate different delay chains in the first delay group DG0 and the second delay group DG1. For example, when the IP block 200 (see FIG. 2) operates in the first state, the CPM 410 may perform first and second delays on the pattern signal A generated from the pattern generator PG through the first delay chain SLDC0 of the first delay group DG0 and any one of the second delay chain LDC1, the third delay chain RDC1, and the fourth delay chain WDC1 of the second delay group DG1 to provide the pattern signal A to the edge detector ED in the form of the delayed pattern signal B. In addition, when the IP block 200 (see FIG. 2) operates in the second state, the CPM 410 may perform first and second delays on the pattern signal A generated from the pattern generator PG through the second delay chain LDC0 of the first delay group DG0 and any one of the first delay chain SLDC1, the third delay chain RDC1, and the fourth delay chain WDC1 of the second delay group DG1 to provide the pattern signal A to the edge detector ED in the form of the delayed pattern signal B. Furthermore, when the IP block 200 (see FIG. 2) operates in the third state, the CPM 410 may perform first and second delays on the pattern signal A generated from the pattern generator PG through the third delay chain RDC0 of the first delay group DG0 and any one of the first delay chain SLDC1, the second delay chain LDC1, and the fourth delay chain WDC1 of the second delay group DG1 to provide the pattern signal A to the edge detector ED in the form of the delayed pattern signal B. In addition, when the IP block 200 (see FIG. 2) operates in the fourth state, the CPM 410 may perform first and second delays on the pattern signal A generated from the pattern generator PG through the fourth delay chain WDC0 of the first delay group DG0 and any one of the first delay chain SLDC1, the second delay chain LDC1, and the third delay chain RDC1 of the second delay group DG1 to provide the pattern signal A to the edge detector ED in the form of the delayed pattern signal B.

Referring to FIGS. 14, 18, and 20, the edge detector ED includes a plurality of inverters INV, a plurality of flip-flops FF, a plurality of XNOR gates XNOR, and a plurality of XOR gates XOR.

The delayed pattern signal B generated through the first delay group DG0 and the second delay group DG1 is gradually delayed by passing though the inverters INV. n flip-flops FF sequentially latch a delayed signal (wherein n is a natural number) and provide the latched signal to the XNOR gate XNOR or the XOR gate XOR and compare the latched signal with the pattern signal A generated from the pattern generator PG to generate a raw thermometer code.

For example, referring to FIG. 20, edge 0 and edge 1 of the pattern signal A are generated from edge 0 and edge 1 of the clock signal CLK. Edge 0 of the delayed pattern signal B is generated from edge 0 of the clock signal CLK using the above-described delay chains.

The flip-flops FF of the edge detector ED sequentially delay and latch edges 0 of the delayed pattern signal B. In the illustrated example, edge 0 of the delayed pattern signal B latched by a $(2i-1)^{th}$ flip-flop FF at a rising edge 1 of a capturing clock capture_CLK precedes edge 1 of the pattern signal A, but edges 0 of the delayed pattern signal B latched by a $(2i)^{th}$ flip-flop FF and a $(2i+1)^{th}$ flip-flop FF at the rising edge 1 of the capturing clock capture_CLK do not precede edge 1 of the pattern signal A. Accordingly, values of a $(2i-1)^{th}$ bit, a $(2i)^{th}$ bit, and a $(2i+1)^{th}$ bit of the raw code become 1, 0, and 0, respectively.

Edge 2 and edge 3 of the pattern signal A are generated from edge 2 and edge 3 of a next clock signal CLK. Edge 2 of the delayed pattern signal B is generated from edge 2 of the clock signal CLK through the above-described configuration.

The flip-flops FF of the edge detector ED sequentially delay and latch the edges 2 of the delayed pattern signal B. In the illustrated example, edge 2 of the delayed pattern signal B latched by the $(2i-1)^{th}$ flip-flop FF and edge 2 of the delayed pattern signal B latched by the $(2i)^{th}$ flip-flop FF at a rising edge 3 of the capturing clock capture_CLK precede edge 3 of the pattern signal A, but edge 2 of the delayed pattern signal B latched by the $(2i+1)^{th}$ flip-flop FF at the rising edge 3 of the capturing clock capture_CLK does not precede edge 3 of the pattern signal A. Accordingly, values of the $(2i-1)^{th}$ bit, the $(2i)^{th}$ bit, and the $(2i+1)^{th}$ bit of the raw code become 1, 1, and 0, respectively.

In order to increase the accuracy of such edge comparison, the edge detector ED according to the present exemplary embodiment alternately uses the plurality of XNOR gates and the plurality of XOR gates XOR. That is, the delayed pattern signal B latched by the $(2i-1)^{th}$ flip-flop FF is provided to the XNOR gate XNOR and compared with the pattern signal A, and the delayed pattern signal B latched by the $(2i)^{th}$ flip-flop FF is provided to the XOR gate XOR and compared with the pattern signal A.

Referring to FIGS. 14 and 19, the post processor PP may receive the raw code from the edge detector ED and may perform necessary processing on the raw code.

According to the above-described operation, in the raw code generated by the edge detector ED, a bit value of 1 should not theoretically appear after a bit value of 0 appears. However, in an actual operation, an incomplete raw code such as 110100 may be generated for various reasons. The post processor PP performs processing on such an unstable raw code and then converts the processed unstable raw code into a binary code to output the binary code. The output code may be provided to, for example, a clock component 120a or the like illustrated in FIG. 2 and used to control a PLL 500.

The CPM 410 according to the present exemplary embodiment may monitor an operating speed of a circuit through such an operation.

Figure 21:
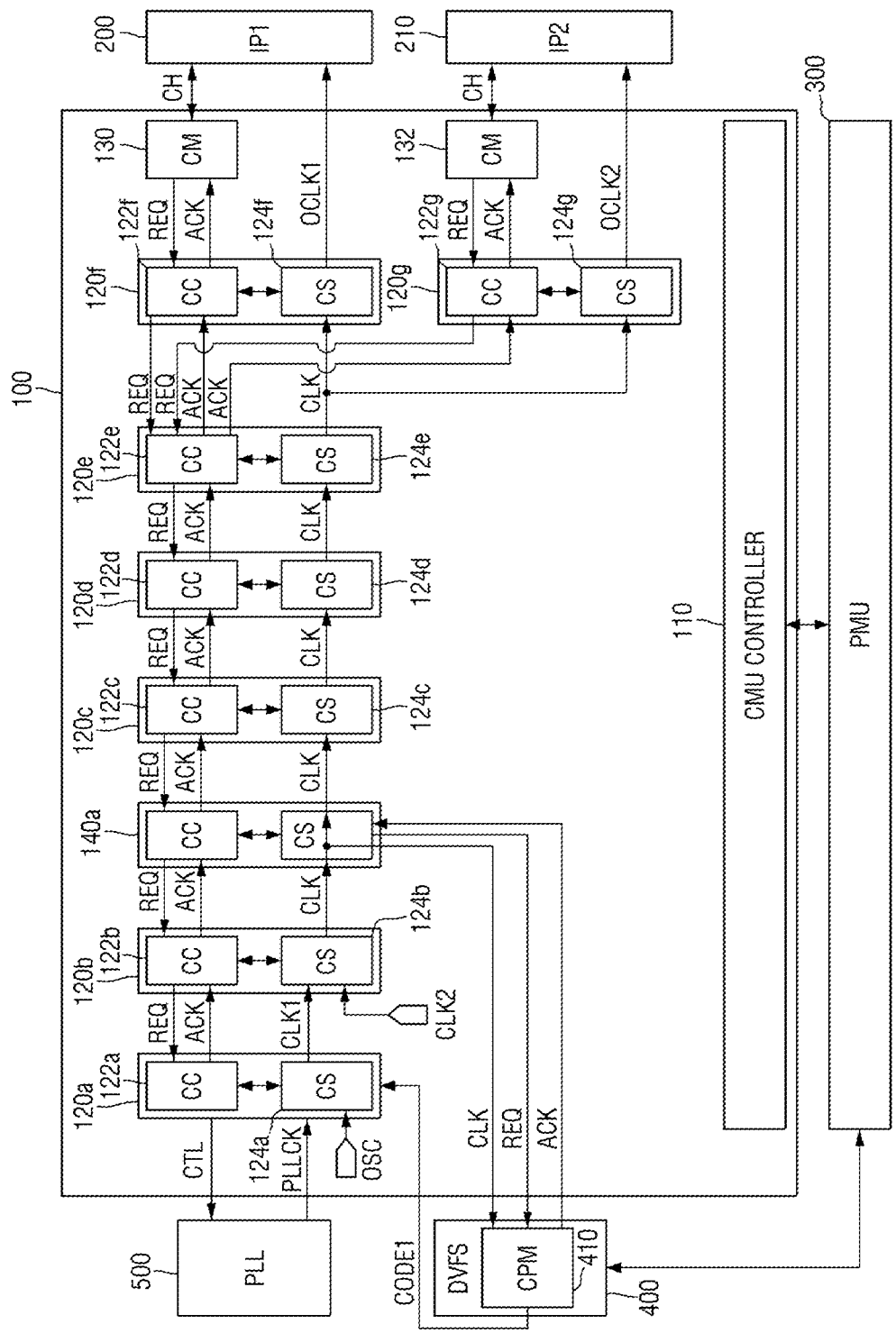
FIG. 21 is a block diagram illustrating a clock management unit included in a semiconductor device according to some other exemplary embodiments.

FIG. 21 is a block diagram illustrating a CMU included in a semiconductor device according to some other exemplary embodiments.

Hereinafter, descriptions overlapping those of the above-described exemplary embodiments will be omitted, and differences will be mainly described.

Referring to FIG. 21, in the present exemplary embodiment, a CPM clock manager 140a is implemented between a clock component 120b and a clock component 120c.

Specifically, the CPM clock manager 140a may provide a clock signal CLK output from the clock component 120b to a CPM 410. The CPM clock manager 140a may transmit a request signal REQ, which indicates a stop request for provision of the clock signal CLK, to the CPM 410 under control of a CMU 100 or a CMU controller 110.

The CPM 410 receiving the request signal REQ transmits, after a task that is being processed is completed, a response signal ACK, which indicates that the clock signal may be stopped, to the CPM clock manager 140a. After receiving the response signal ACK from the CPM 410, the CPM clock manager 140a may request a clock component corresponding to a parent thereof (for example, the clock component 120b) to stop provision of the clock signal.

Figure 22:
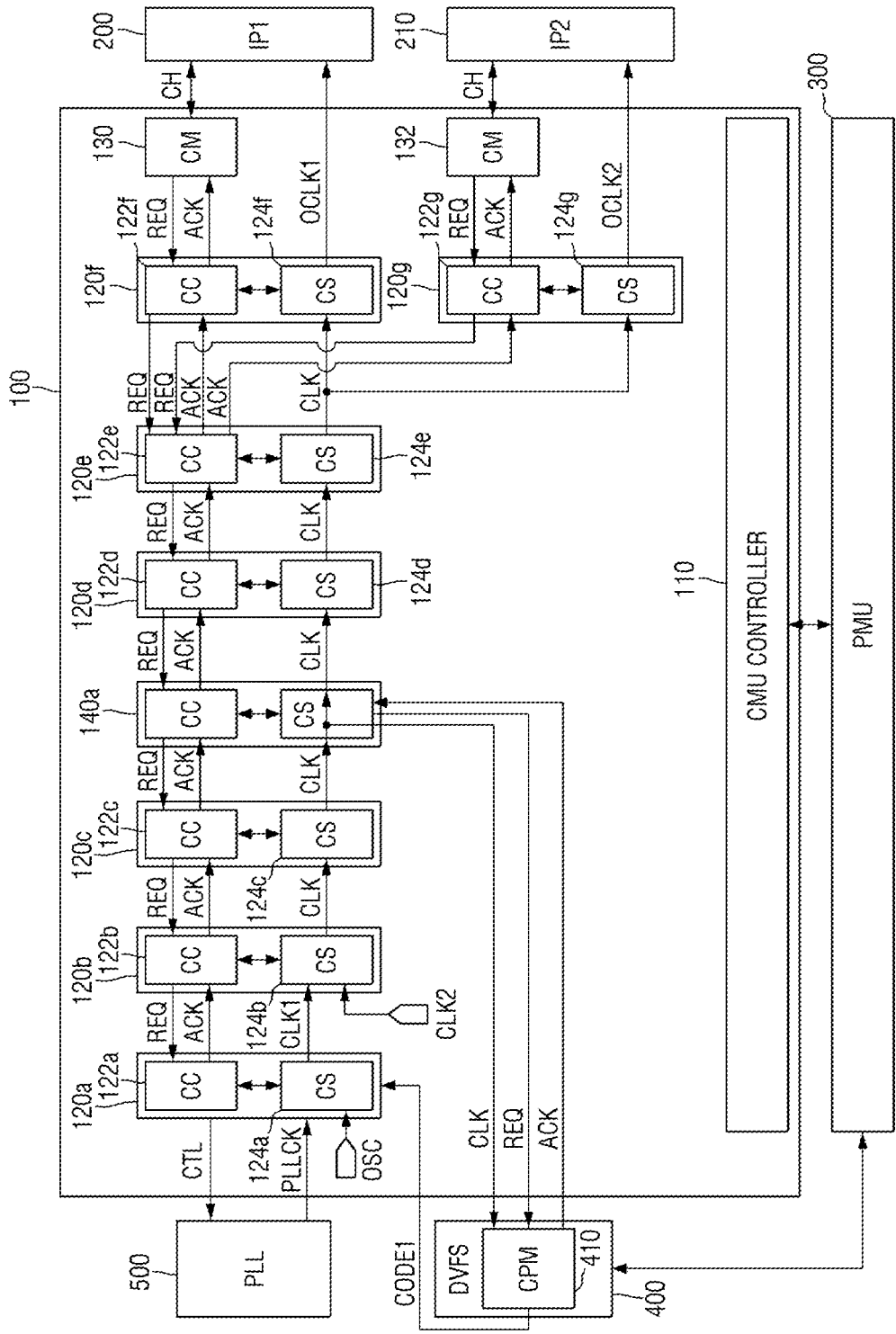
FIG. 22 is a block diagram illustrating a clock management unit included in a semiconductor device according to some other exemplary embodiments.

FIG. 22 is a block diagram illustrating a CMU included in a semiconductor device according to some embodiments.

Hereinafter, descriptions overlapping those of the above-described exemplary embodiments will be omitted, and differences will be mainly described.

Referring to FIG. 22, in the present exemplary embodiment, a CPM clock manager 140a is implemented between a clock component 120c and a clock component 120d.

Specifically, the CPM clock manager 140a may provide a clock signal CLK output from the clock component 120c to a CPM 410. The CPM clock manager 140a may transmit a request signal REQ, which indicates a stop request for provision of the clock signal CLK, to the CPM 410 under control of a CMU 100 or a CMU controller 110.

The CPM 410 receiving the request signal REQ transmits, after a task that is being processed is completed, a response signal ACK, which indicates that the clock signal may be stopped, to the CPM clock manager 140a. After receiving the response signal ACK from the CPM 410, the CPM clock manager 140a may request a clock component corresponding to a parent thereof (for example, the clock component 120c) to stop provision of the clock signal.

Figure 23:
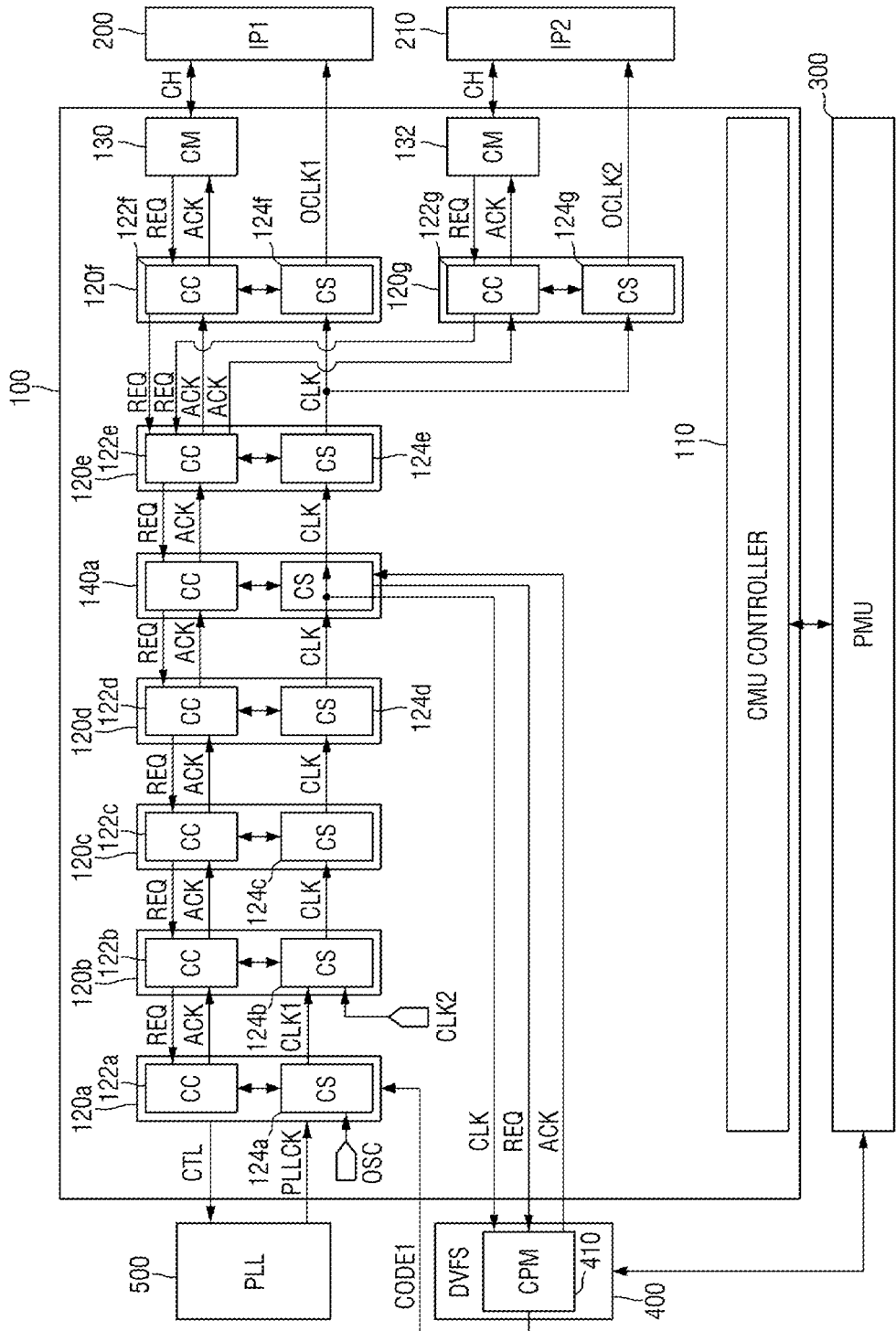
FIG. 23 is a block diagram illustrating a clock management unit included in a semiconductor device according to some other exemplary embodiments.

FIG. 23 is a block diagram illustrating a CMU included in a semiconductor device according to some embodiments.

Hereinafter, descriptions overlapping those of the above-described exemplary embodiments will be omitted, and differences will be mainly described.

Referring to FIG. 23, in the present exemplary embodiment, a CPM clock manager 140a is implemented between a clock component 120d and a clock component 120e.

Specifically, the CPM clock manager 140a may provide a clock signal CLK output from the clock component 120d to a CPM 410. The CPM clock manager 140a may transmit a request signal REQ, which indicates a stop request for provision of the clock signal CLK, to the CPM 410 under control of a CMU 100 or a CMU controller 110.

The CPM 410 receiving the request signal REQ transmits, after a task that is being processed is completed, a response signal ACK, which indicates that the clock signal may be stopped, to the CPM clock manager 140a. After receiving the response signal ACK from the CPM 410, the CPM clock manager 140a may request a clock component corresponding to a parent thereof (for example, the clock component 120d) to stop provision of the clock signal.

In the case of the present exemplary embodiment, since the CPM clock manager 140a is disposed adjacent to IP blocks 200 and 210, the CPM 410 may monitor a clock signal most similar to operation clock signals OCLK1 and OCLK2 provided to the IP blocks 200 and 210 so that a DVFS operation corresponding to an actual operation situation of the IP blocks 200 and 210 may be possible.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure. An aspect of an embodiment may be achieved through instructions stored within a non-transitory storage medium and executed by a processor.

Although the exemplary embodiments of the present disclosure have been described with reference to the accompanying drawings, the present disclosure is not limited to the exemplary embodiments and may be prepared in various forms, and it will be understood by those skilled in the art to which the present disclosure pertains that the present disclosure can be carried out in other detailed forms without changing the technical spirits and essential features thereof. Therefore, it should be understood that the exemplary embodiments described herein are illustrative and not restrictive in all aspects.

What is claimed is:

1. A semiconductor device comprising:
   a first clock circuit that transmits a first request indicating a processor does not want to receive a clock signal;
   a clock manager circuit that transmits a second request indicating the processor does not want to receive the clock signal in response to receiving the first request; and
   a dynamic voltage frequency scaling (DVFS) circuit that, in response to receiving the second request, discontinues generating a code applied to regulating a clock frequency at which the processor operates and transmits a first acknowledgment to the clock manager circuit.

2. The semiconductor device of claim 1, wherein the clock manager circuit, in response to receiving the first request, transmits a second acknowledgment to the first clock circuit.

3. The semiconductor device of claim 1, further comprising:
a second clock circuit, wherein
the clock manager circuit transmits to the second clock circuit, in response to receiving the first acknowledgment, a third request indicating the processor does not want to receive the clock signal.

4. The semiconductor device of claim 3, wherein the second clock circuit, in response to receiving the third request, transmits a second acknowledgment to the clock manager circuit.

5. The semiconductor device of claim 1, wherein the second request has a first logical level and the first acknowledgement has the first logical level.

6. The semiconductor device of claim 5, wherein the first logical level is a low logical level.

7. The semiconductor device of claim 1, wherein the clock manager circuit incudes:
a first clock source configured to provide a clock signal to the DVFS circuit; and
a first clock control circuit configured to control the first clock source.

8. The semiconductor device of claim 7, wherein the clock manager circuit continues to provide the clock signal to the DVFS circuit after transmitting the second request to the DVFS circuit.

9. The semiconductor device of claim 7, further comprising:
a second clock circuit that provides the clock signal to the clock manager circuit,
wherein the second clock circuit includes:
a second clock source configured to provide the clock signal to the first clock source; and
a second clock control circuit configured to control the second clock source.

10. The semiconductor device of claim 9, wherein the second clock circuit includes a PLL controller.

11. The semiconductor device of claim 9, wherein the second clock circuit includes a clock MUX circuit.

12. The semiconductor device of claim 9, wherein the second clock circuit includes a clock dividing circuit.

13. The semiconductor device of claim 9, wherein the second clock circuit includes a shot stop circuit.

14. A semiconductor device comprising:
a first clock circuit configured to:
receive a first clock signal and provide a second clock signal to a first processor based on the first clock signal; and
transmit a first request in response to receiving a first clock stop request from the first processor,
a clock manager circuit configured to:
provide a monitoring clock signal to a dynamic voltage frequency scaling (DVFS) circuit;
transmit a second request to the DVFS circuit to stop providing the monitoring clock signal in response to receiving the first request; and
receive a first acknowledgment from the DVFS circuit.

15. The semiconductor device of claim 14, further comprising:
a second clock circuit configured to:
receive the first clock signal and provide a third clock signal to a second processor based on the first clock signal; and
transmit a third request in response to receiving a second clock stop request from the second processor,
wherein the clock manager circuit is configured to:
transmit a fourth request to the DVFS circuit to stop providing the monitoring clock signal in response to receiving the third request; and
receive a second acknowledgment from the DVFS circuit.

16. The semiconductor device of claim 14, further comprising:
a second clock circuit configured to:
receive a third clock signal and provide the first clock signal to the first clock circuit and the monitoring clock signal to the clock manager circuit based on the third clock signal; and
receive a second clock stop request from the clock manager circuit.

17. The semiconductor device of claim 16, wherein the clock manager circuit transmits the second clock stop request to the second clock circuit in response to receiving the first acknowledgment from the DVFS circuit.

18. A semiconductor device comprising:
a first clock circuit configured to:
receive a first clock signal and provide a second clock signal to a first processor based on the first clock signal; and
transmit a first request in response to receiving a first clock stop request from the first processor,
a clock manager circuit configured to:
receive a third clock signal;
provide the first clock signal to the first clock circuit and a monitoring clock signal to a dynamic voltage frequency scaling (DVFS) circuit based on the third clock signal;
transmit a second request to the DVFS circuit to stop providing the monitoring clock signal in response to receiving the first request; and
receive a first acknowledgment from the DVFS circuit,
a second clock circuit configured to:
receive a fourth clock signal;
provide the third clock signal to the clock manager circuit based on the fourth clock signal.

19. The semiconductor device of claim 18, wherein the clock manager circuit transmits a second clock stop request to stop providing the third clock signal to the second clock circuit in response to receiving the first acknowledgment from the DVFS circuit.

* * * * *